US012787083B2

(12) United States Patent
Wong et al.

(10) Patent No.: US 12,787,083 B2
(45) Date of Patent: Nov. 3, 2026

(54) SYSTEM AND METHOD OF PRE-PAIRING FOR A WIRELESS PERIPHERAL DEVICE WITH CONTENTION ARBITRATION FOR A PLURALITY OF POTENTIAL HOST INFORMATION HANDLING SYSTEMS

(71) Applicant: Dell Products LP, Round Rock, TX (US)

(72) Inventors: Kai Leong Wong, Singapore (SG); Manish Krishnaji Desai, Singapore (SG); Harpreet S. Narula, Austin, TX (US)

(73) Assignee: DELL PRODUCTS LP, Round Rock, TX (US)

(*) Notice: Subject to any disclaimer, the term of this patent is extended or adjusted under 35 U.S.C. 154(b) by 30 days.

(21) Appl. No.: 18/648,709

(22) Filed: Apr. 29, 2024

(65) Prior Publication Data

US 2025/0338330 A1 Oct. 30, 2025

(51) Int. Cl.
*H04W 76/14* (2018.01)
*H04L 9/06* (2006.01)

(52) U.S. Cl.
CPC ........... *H04W 76/14* (2018.02); *H04L 9/0643* (2013.01)

(58) Field of Classification Search
CPC ..... H04W 76/14; H04W 8/005; H04W 88/04; H04L 9/0643
USPC .......................................................... 713/168
See application file for complete search history.

(56) References Cited

U.S. PATENT DOCUMENTS

| | | | | |
|---|---|---|---|---|
| 11,576,100 | B2 | 2/2023 | Choi | |
| 2002/0147816 | A1 | 10/2002 | Hlasny | |
| 2006/0129679 | A1 | 6/2006 | Hlasny | |
| 2011/0305337 | A1* | 12/2011 | Devol | G06F 21/552 726/16 |
| 2014/0219193 | A1 | 8/2014 | Linde | |

(Continued)

FOREIGN PATENT DOCUMENTS

| | | | | |
|---|---|---|---|---|
| CN | 118573610 A * | 8/2024 | | H04W 4/80 |
| EP | 1344339 A1 | 9/2003 | | |
| EP | 1344339 B1 | 5/2015 | | |

*Primary Examiner* — Meng Vang
(74) *Attorney, Agent, or Firm* — Prol Intellectual Property Law, PLLC; H. Kenneth Prol

(57) ABSTRACT

A system and method for pre-pairing arbitration of a wireless peripheral device among a plurality of candidate host information handling systems comprising a hardware microcontroller executing code instructions of a pre-pairing host contention and arbitration module to transmit a first pairing proximity discovery beacon and a second pairing proximity beacon to the candidate host information handling systems, the first pairing proximity beacon having lower signal power than the second pairing proximity beacon, and to transmit an instruction to cease pairing to any candidate host information handling system failing to respond to the first pairing proximity beacon. The proximity distances for remaining candidate host information handling systems are determined based on received signal strength indicator values of the first pairing proximity discovery beacon and the second pairing proximity beacon to select a closest first candidate host information handling system and prompt pairing at that first candidate host information handling system.

20 Claims, 8 Drawing Sheets

(56) References Cited

U.S. PATENT DOCUMENTS

| | | | | |
|---|---|---|---|---|
| 2015/0112748 | A1* | 4/2015 | Kaye | H04M 3/569<br>705/7.19 |
| 2017/0201380 | A1* | 7/2017 | Schaap | H04L 63/083 |
| 2018/0007499 | A1 | 1/2018 | Lee | |
| 2018/0069726 | A1 | 3/2018 | Ohhira | |
| 2019/0075456 | A1* | 3/2019 | Evans | G09C 5/00 |
| 2019/0305903 | A1* | 10/2019 | Badic | H04W 72/542 |
| 2020/0344608 | A1 | 10/2020 | Duo | |
| 2021/0076163 | A1 | 3/2021 | Burowski | |
| 2021/0227391 | A1 | 7/2021 | Duo | |
| 2021/0337360 | A1 | 10/2021 | Burowski | |
| 2022/0109575 | A1* | 4/2022 | Kapinos | H04L 9/3247 |
| 2022/0210735 | A1 | 6/2022 | Narula | |
| 2023/0136293 | A1* | 5/2023 | Pierson | H04L 9/3236<br>726/7 |
| 2023/0362645 | A1 | 11/2023 | Duo | |

* cited by examiner

SYSTEM AND METHOD OF PRE-PAIRING FOR A WIRELESS PERIPHERAL DEVICE WITH CONTENTION ARBITRATION FOR A PLURALITY OF POTENTIAL HOST INFORMATION HANDLING SYSTEMS

FIELD OF THE DISCLOSURE

The present disclosure generally relates to a system to operatively couple a peripheral device to an information handling system. The present disclosure more specifically relates to a system and method to filter pre-paired candidate host information handling systems with host contention arbitration and operatively couple a wireless peripheral device among the plurality of candidate host information handling systems in a workspace.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more workspace productivity applications, or gaming applications or the like. Further, the information handling system may include a radio to operatively couple or pair a wireless peripheral device to the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1A:
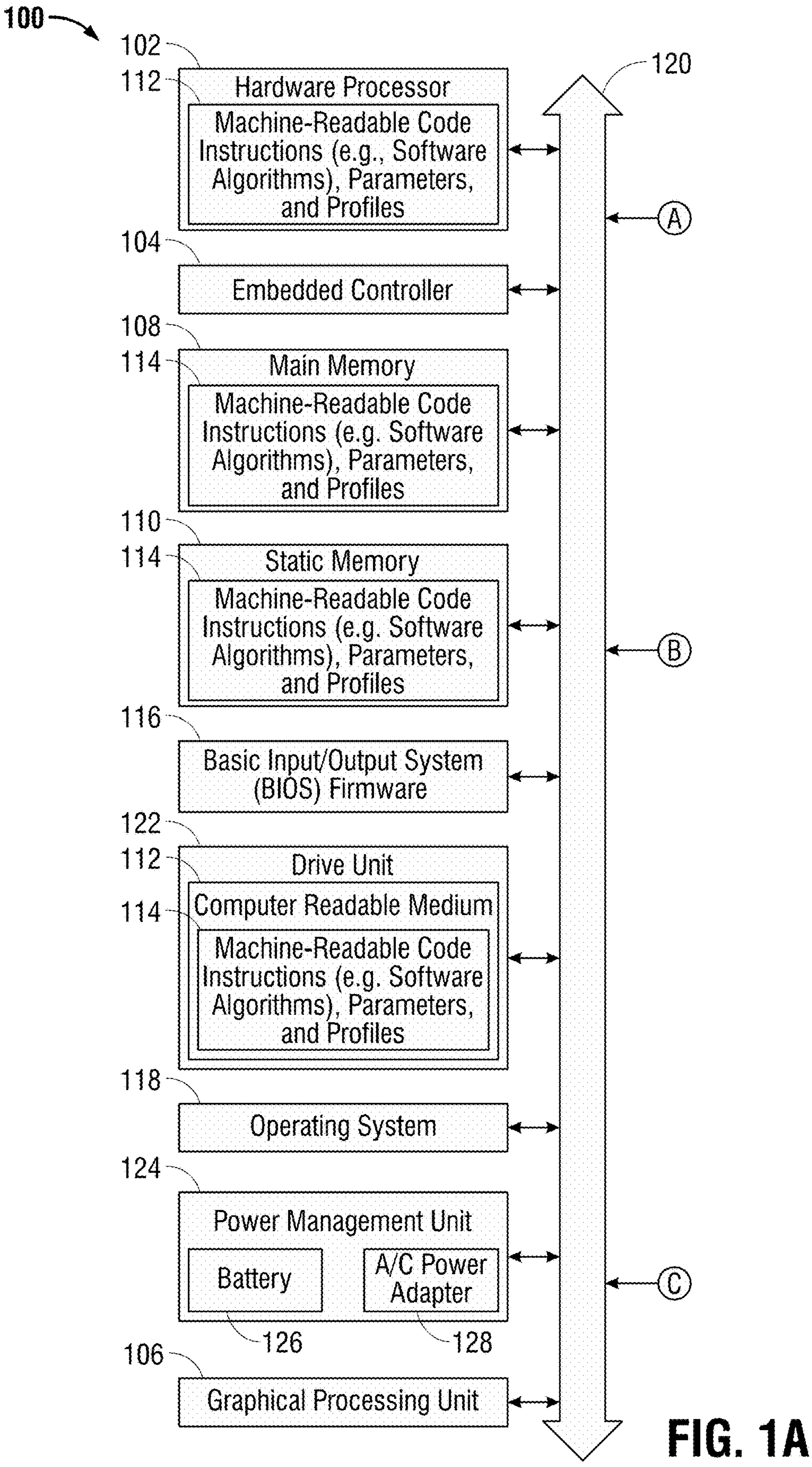
FIG. 1A is a block diagram and FIG. 1B is a continuing block diagram illustrating an information handling system that may operate as a candidate host information handling system to be operatively coupled to a wireless peripheral device executing code instruction of a pre-pairing host contention and arbitration module to manage pairing according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may be operatively coupled to a peripheral device that allows the user to interact with the information handling system. These peripheral devices may include a mouse, a keyboard, a video display device, a stylus, a trackpad, and the like that allows a user to provide input to the information handling system and receive output from the information handling system. These peripheral devices may be wirelessly couplable to the information handling system through the use of various radio frequency (RF) radios in the information handling system and the peripheral device. This operative coupling may include pairing the peripheral device to the information handling system, for example under Bluetooth® or Bluetooth® Low Energy (BLE) standards of wireless communications. Current pairing processes may include initiation or turning on the information handling system and peripheral device and initiating an initial communication such that confirming pairing data may be exchanged between the peripheral device and information handling system. One current pairing process includes a user to confirm a pin or other alphanumeric code on a display device of, for example, the information handling system to achieve a security standard level for the pairing. However, without the ability to input this code, this pairing process using a displayed alphanumeric code would not work. This occurs in "headless peripheral devices" that do not include these input capabilities or have other input capabilities that do not allow for input of the alphanumeric. In order to overcome this, these headless peripheral devices may be hard coded or include in a data storage device the alphanumeric code that is exchanged automatically between the peripheral device and the information handling system. Similarly, with smart devices that include, for example, its own hardware processing device such as a microcontroller, a random number generator may be provided to generate this alphanumeric code or other code that is exchanged between the peripheral device and the information handling system. However, this process only works for peripheral devices that have input capabilities that allow for this input.

Additionally, when a wireless peripheral device is initially turned on in a congested environment with a plurality of information handling systems proximate within Bluetooth® radio range in a workspace, there is a risk of contention when many candidate host information systems concurrently raise notification to ask for pairing, and a risk that multiple candidate host information handling systems may respond for pairing. This may raise a security issue if the wrong candidate host information handling system may opt in to pair. Further, the raising notifications to pair at plural candidate host information handling systems, many of which are not the correct host information handling system of a user with possession of the wireless peripheral device, may be distracting and undesirable for other user's in a workspace.

The present specification describes a wireless peripheral device microcontroller executing computer readable code instructions of a pre-pairing host contention and arbitration module at the wireless peripheral device to initially eliminate any candidate host information handling systems that fall outside a distance range or below a particular threshold received signal strength indicator (RSSI) signal level in an embodiment of the present disclosure. Further, present specification describes a wireless peripheral device microcontroller executing computer readable code instructions of a pre-pairing host contention and arbitration module and a method of determining distances or receiving indications of distances determined at a remote, secure network location for candidate host information handling systems in a workspace from the wireless peripheral device to then determine distance proximity among remaining candidate host information handling systems to assess closest proximity. Such an assessment of proximity distance is used to select a closest candidate information handling systems to continue to pair with and raise notification graphical user interfaces (GUIs) on for further Bluetooth® or Bluetooth® Low Energy (BLE) pairing in the workspace in embodiments of the present disclosure.

The pre-pairing host contention and arbitration module may communicate pairing proximity beacons with the one or more candidate host information handling systems executing pre-pairing host contention and arbitration agents to assist in executing a method of determining distances at a secure, shared wireless network location for the plural candidate host information handling systems. The secure, shared wireless network location may be sent received signal strength indicator (RSSI) measurements from the pairing proximity beacons to determine proximity distances to continue pairing operations for a selected candidate host information handling system in an embodiment. In other embodiments, where a common secure network location may not be available or it is preferred to use the wireless peripheral device, the distance determinations of candidate host information handling systems for pairing selection may be conducted at the wireless peripheral device.

In an embodiment, the wireless peripheral device may execute computer-readable program code of pre-pairing host contention and arbitration module to determine or receive indications of distances determined at a remote, secure network location for candidate host information handling systems in a workspace to compare those pairing proximity distances. The pre-pairing host contention and arbitration module may then compare pairing proximity distances select one candidate host information handling system for pairing and to reduce the number of proximate candidate host information handling systems in a workspace area that are prompted for pairing. The pre-pairing host contention and arbitration module and agents on the candidate host information handling systems operate to provide self-arbitration to eliminate to one or a small plurality of candidate host information handling systems to be prompted for the pairing process with a new wireless peripheral device looking to pair. This can reduce collisions upon pairing and streamline the pairing process with the correct candidate host information handling system. The correct candidate host information handling system is likely a closest information handling system to a user in possession of the wireless peripheral device and, thus, the intended candidate host information handling system for pairing. Further, the systems and methods of the pre-pairing host contention and arbitration module and agents reduces the number of nearby candidate host information handling systems that are prompted for pairing to provide a better user experience.

Figure 1B:
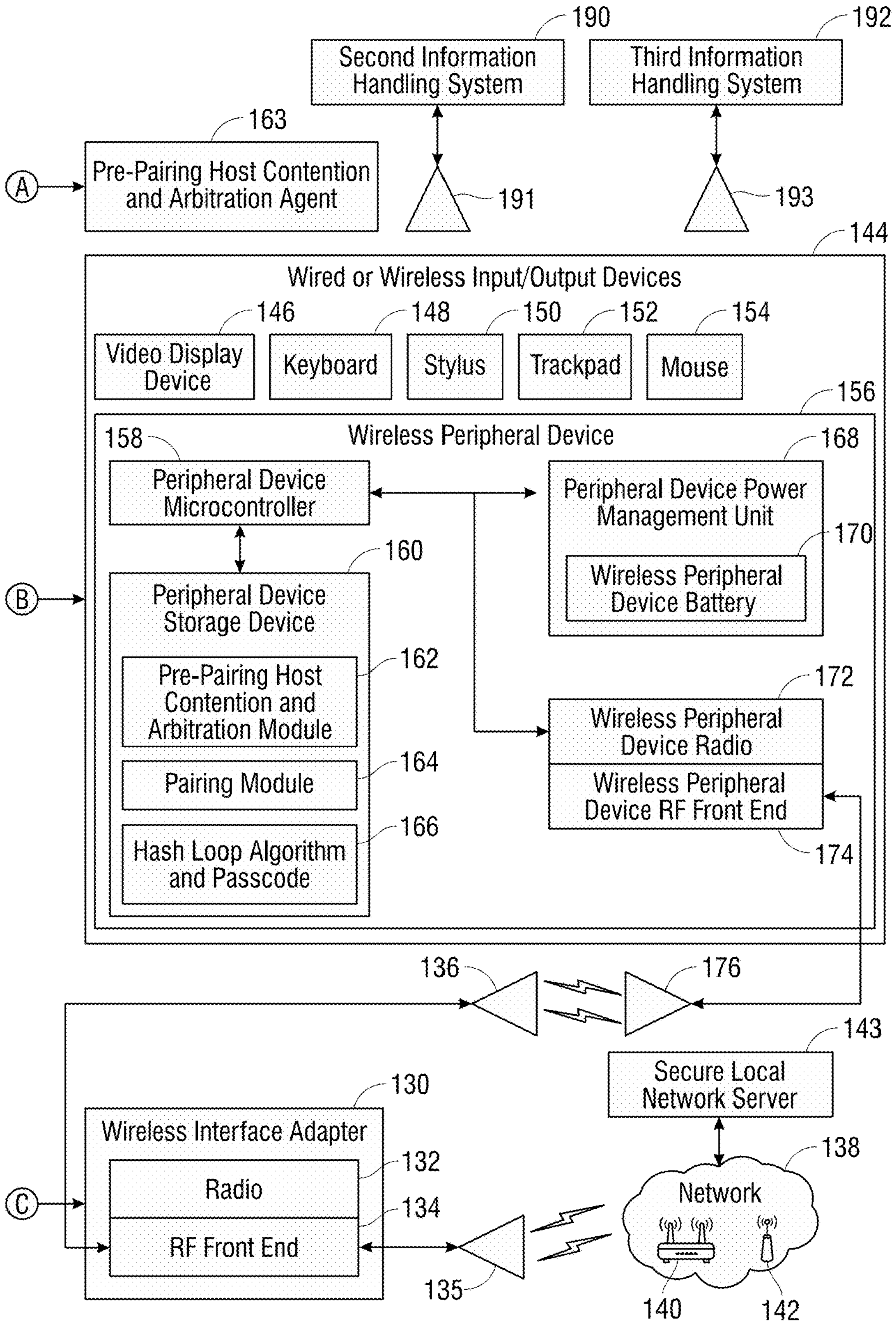

Turning now to the figures, FIG. 1A and FIG. 1B illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 140, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 108, (volatile (e.g., random-access memory, etc.), or static memory 110, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, or any combination thereof. Additional components of the information handling system 100 may include one or more storage devices such as static memory 110 or drive unit 122. The information handling system 100 may include or interface with one or more communications ports for communicating with external devices, as well as various input and output (I/O) devices 144, such as a docking station 156, a mouse 154, a trackpad 152, a stylus 150, a keyboard 148, a video/graphics display device 146, the first wireless peripheral device 156, or any combination thereof. Portions of an information handling system 100 may themselves be considered information handling systems 100. Moreover, in embodiments of the present disclosure the wireless peripheral device 156 may be any of the wireless peripheral devices 144 and may, upon initiation, seek to pair with one or more candidate host information handling systems 100, 190, or 192 that may be proximate and within radio range of the wireless peripheral device 156 within a workspace. A workspace in embodiments of the present disclosure may include nearby information handling system 100, nearby second information handling system 190, nearby third information handling system 192, and potentially any other information handling systems. It is appreciated that second information handling system 190, third information handling system 192, and so forth may be similar in structure, components, software and firmware, and operations as described with respect to information handling system 100 in embodiments of the present specification.

Information handling system 100 may include devices or modules that embody one or more of the devices or execute instructions for one or more systems and modules. The information handling system 100 may execute instructions (e.g., software algorithms), parameters, and profiles 114 that may operate on servers or systems, remote data centers, or on-box in individual client information handling systems according to various embodiments herein. In some embodiments, it is understood any or all portions of instructions (e.g., software algorithms), parameters, and profiles 114 may operate on a plurality of information handling systems 100.

The information handling system 100 may include the hardware processor 102 such as a central processing unit (CPU) or other hardware processing resources. Any of the hardware processing resources may operate to execute code that is either firmware or software code. Moreover, the information handling system 100 may include memory such as main memory 108, static memory 110, and disk drive unit 122 (volatile (e.g., random-access memory, etc.), nonvolatile memory (read-only memory, flash memory etc.) or any combination thereof or other memory with computer readable medium 112 storing instructions (e.g., software algorithms), parameters, and profiles 114 executable by the hardware processor 102, EC 104, GPU 106, or any other hardware processing device. The information handling system 100 may also include one or more buses 120 operable to transmit communications between the various hardware components such as any combination of various I/O devices 144 as well as between hardware processors 102, an EC 104, the operating system (OS) 118, the basic input/output system (BIOS) 116, the wireless interface adapter 130, or a radio module, among other components described herein. In an embodiment, the hardware processor 102, EC 104, and/or GPU 106 may execute one or more bus drivers in order to transmit this data between the information handling system 100 and the input/output devices 144 described herein. In an embodiment, the information handling system 100 may be in wired or wireless communication with the I/O devices 144 such as a wireless headset 158, wireless headset dock 196, docking station 152, a keyboard 148, a mouse 154, video display device 146, stylus 150, trackpad 152, or the first wireless peripheral device 156, which may be any peripheral device described herein.

As described herein, the information handling system 100 further includes a video/graphics display device 146. The video/graphics display device 146 in an embodiment may function as a liquid crystal display (LCD), an organic light emitting diode (OLED), a flat panel display, or a solid-state display. It is appreciated that the video/graphics display device 146 may be wired or wireless and may be an external video/graphics display device 146 that allows a user to increase the desktop area by extending the desktop in an embodiment. Additionally, as described herein, the information handling system 100 may include or be operatively coupled to a cursor control device (e.g., a trackpad 152, or gesture or touch screen input), a stylus 150, and/or a keyboard 148, among others that allows the user to interface with the information handling system 100 via the video/graphics display device 146. Information handling system 100 may also be operatively coupled to a wired or wireless input/output device 144 such as the wireless peripheral device 156 that may include a hardware processing device such as a hardware processor, microcontroller, or other hardware processing resource. Various drivers and hardware control device electronics may be operatively coupled to operate the I/O devices 144 according to the embodiments described herein. The present specification contemplates that the I/O devices 144 may be wired or wireless.

A network interface device of the information handling system 100 may be wired or wireless such as shown with wireless interface adapter 130 that can provide wireless connectivity among wireless peripheral devices, such as 156, with Bluetooth® or Bluetooth® Low Energy (BLE) wireless protocols. The network interface device of the information handling system 100 may be wired or wireless such as shown with wireless interface adapter 130 and can provide wireless connectivity to a network 138 for connectivity to additional remote resources such as secure local network server 143 or other server or client networked systems, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antenna 136 is used to communicate with the wireless peripheral devices including the wireless peripheral device 156 via, for example, the Bluetooth® or BLE protocols. In other embodiments, Bluetooth®, BLE or other WPAN or WLAN may be used for communication with and among a wireless peripheral devices such as the wireless peripheral device 156 or any other wireless peripheral device and may require that the wireless peripheral device 156 pair the information handling system 100.

In other embodiments, a WAN, WWAN, LAN, and WLAN may each include an AP 140 or base station 142 used to operatively couple the information handling system 100 to a network 138 via a wireless interface adapter 130. In a specific embodiment, the network 138 may include macro-cellular connections via one or more base stations 142 or a wireless AP 140 (e.g., Wi-Fi), or such as through licensed or unlicensed WWAN small cell base stations 142. Connectivity may be via wired or wireless connection. For example, wireless network wireless APs 140 or base stations 142 may be operatively connected to the information handling system 100. Wireless interface adapter 130 may include one or more radiofrequency (RF) subsystems (e.g., radio 132) with transmitter/receiver circuitry, modem circuitry, one or more antenna RF front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 138 may communicate voice, video, or data over the network 138. Further, the instructions 114 may be transmitted or received over the network 138 via the network interface device or wireless interface adapter 130.

The information handling system 100 may include a set of instructions 114 that may be executed to cause the computer system to perform any one or more of the methods or computer-based functions disclosed herein. For example, instructions 114 may be executed by a hardware processor 102, GPU 106, EC 104 or any other hardware processing resource and may include software agents, or other aspects or components used to execute the methods and systems described herein. Various software modules comprising application instructions 114 may be coordinated by an OS 118, and/or via an application programming interface (API) include a unified device API described herein. An example OS 118 may include Windows®, Android®, and other OS types. Example APIs may include Win 32, Core Java API, or Android APIs.

In an embodiment, the information handling system 100 may include a disk drive unit 122. The disk drive unit 122 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC 104, or other microcontroller unit to perform the processes described herein. Similarly, main memory 108 and static memory 110 may also contain a computer-readable medium for storage of one or more sets of machine-readable code instructions, parameters, or profiles 114 described herein. The disk drive unit 122 or static memory 110 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 108, the static memory 110, and/or within the disk drive 122 during execution by the hardware processor 102, EC 104, or GPU 106 of information handling system 100.

Main memory 108 or other memory of the embodiments described herein may contain computer-readable medium (not shown), such as RAM in an example embodiment. An example of main memory 108 includes random access memory (RAM) such as static RAM (SRAM), dynamic RAM (DRAM), non-volatile RAM (NV-RAM), or the like, read only memory (ROM), another type of memory, or a combination thereof. Static memory 110 may contain computer-readable medium (not shown), such as NOR or NAND flash memory in some example embodiments. The applications and associated APIs, for example, may be stored in static memory 110 or on the disk drive unit 122 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 124 (a.k.a. a power supply unit (PSU)). The PMU 124 may include a hardware controller and executable machine-readable code instructions to manage the power provided to the components of the information handling system 100 such as the hardware processor 102 and other hardware components described herein. The PMU 124 may control power to one or more components including the one or more drive units 122, the hardware processor 102 (e.g., CPU), the EC 104, the GPU 106, a video/graphic display device 146, or other wired I/O devices 144 such as the mouse 154, the stylus 150, the keyboard 148, and the trackpad 152 and other components that may require power when a power button has been actuated by a user. In an embodiment, the PMU 124 may monitor power levels and be electrically coupled to the information handling system 100 to provide this power. The PMU 124 may be coupled to the bus 120 to provide or receive data or machine-readable code instructions. The PMU 124 may regulate power from a power source such as the battery 126 or AC power adapter 128. In an embodiment, the battery 126 may be charged via the AC power adapter 128 and provide power to the components of the information handling system 100, via wired connections as applicable, or when AC power from the AC power adapter 128 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may be operatively and wirelessly coupled to any number of wireless peripheral devices including the wireless peripheral device 156 as described herein. Again, this wireless coupling, may include a pairing requirement before active wireless input/output (I/O) communications are established and may include the communication from the wireless peripheral device 156 that initiates a pairing communication with at least the information handling system 100 to engage in the pairing process and may cause a notice of pairing request to appear on the video display device 146 of information handling system. During this pre-pairing period however, any of the first information handing system 100, second information handling system 190, or third information handling system in a congested workspace and within wireless range may receive the request to pair from the wireless peripheral device 156. This may create a potential security risk or may simply be undesirable since it is likely that the user or owner of the wireless peripheral device 156 only intends for pairing with one information handling system 100. Accordingly, with initiation of the wireless peripheral device 156 a first time may cause execution of code instructions of a pre-pairing host contention and arbitration module by the peripheral device microcontroller 158 or other hardware processing resource may provide host contention and arbitration to select a candidate host information handling system in embodiments of the present disclosure.

This initiation process may include the user activating a power button, switch, or other key of the wireless peripheral device 156 that causes, in an embodiment, a peripheral device PMU 168 to provide power to the peripheral device microcontroller 158. It is appreciated that the wireless peripheral device 156 upon initiation may concurrently begin to attempt to pair with any of the proximate information handling system 100, second information handling system 190, third information handling system 192, or others within a congested workspace. In previous operations of pairing the wireless peripheral device 156 to the information handling system 100, this may result in pairing requests being sent to each of information handling system 100, second information handling system 190, third information handling system 192 within Bluetooth® or BLE radio range in a congested workspace and to raise multiple Bluetooth® or BLE pairing notifications on each of information handling system 100, second information handling system 190, third information handling system 192. This may thereby create security risks, create potential for errors in pairing, create confusion or annoyance for users, and possibly increase the duration of time to pair the wireless peripheral device to the intended information handling system 100.

To minimize invoking pairing request notifications between the wireless peripheral device 156 and information handling system 100, second information handling system 190, third information handling system 192, the peripheral device microcontroller 158 executes code instructions of a pre-pairing host contention and arbitration module 162 upon initiation and commencing attempts to pair with the information handling system 100, the second information handling system 190, or the third information handling system 192 to filter out and determine an intended candidate host information handling system 100 for pairing based on proximity to the wireless peripheral device 156. The systems and methods described herein allow for an initial pairing wireless peripheral device 156 to automatically determine along with any nearby candidate host information handling system 100, second candidate host information handling system 190, or third candidate host information handling system 192 distances via RSSI levels from multiple communications of pairing proximity beacons. Multiple communications of pairing proximity beacons are used to improve accuracy of distances and reject errant data to determine if any of the information handling system 100, second information handling system 190, or third information handling system 192 as candidate host information handling systems are beyond a threshold distance or RSSI level. Exchange of multiple communications of pairing proximity beacons is further used to determine proximity distances and assess relative proximity of remaining information handling systems in embodiments herein. This is done to eliminate candidates based on proximity distances estimated from those RSSI measurements of plural exchanged pairing proximity discovery beacons from the wireless peripheral device and each remaining plurality of information handling system 100, second information handling system 190, or third information handling system 192 or others.

Execution of code instructions of a pre-pairing host contention and arbitration agent on a secure local network 143 that is securely and operatively coupled to each of the candidate host information handling systems 100, 190, 192 may determine relative distances based on pathloss levels of any remaining candidate host information handling systems 100, 190, 192 not initially eliminated as being too far. In some embodiments, a secure local network server 143 is not specifically required, and peer-to-peer sharing of RSSI levels may take place via a secure local network protocol, to broadcast shared RSSI levels among the information handling system 100, second information handling system 190, and third information handling system 192 any one or more of which may execute code instructions of a pre-pairing host contention and arbitration agent 163 to determine proximity distances of remaining candidate host information handling systems 100, 190, 192 based on pathloss determination from pairing proximity beacon RSSI measurements in an embodiment. If one candidate information handling system 100 is determined to be closer to the wireless peripheral device 156 by a threshold proximity distance difference amount over than proximity distances of the second information handling system 190 and the third information handling system 192, or others, the pre-pairing host contention and arbitration module 162 selects the first information handling systems 100. Further, the wireless peripheral device 156 invokes a pairing module 164 to initiate pairing with the selected information handling system 100 including invoking a notification of a request to pair at information handling system 100 at a display device. Then, the code instructions of the pre-pairing host contention and arbitration module 162 may send a message to the second information handling system 190, the third information handling system 192, or others to ignore or not respond to pairing requests from the wireless peripheral device 156 in embodiments herein. In some embodiments, where a secure local network 143 or peer-to-peer connectivity is unavailable to receive RSSI data from candidate host information handling system 100, 190, 192 for the multiple communications of pairing proximity beacons for determination of proximity distance, determines pathloss levels for proximity distances that may be conducted by a peripheral device hardware microcontroller 158 or other hardware processing resource of wireless peripheral device 156 executing code instructions of the per-pairing host contention and arbitration module 162.

Each of the information handling system 100, second information handling system 190, third information handling system 192 via peer-to-peer network, or any available secure local network server 143 may execute code instructions of a pre-pairing host contention and arbitration agent 163 in an embodiment. The candidate host information handling systems 100, 190, and 192 may execute code instructions of the pre-pairing host contention and arbitration agent 163 to receive and send pairing proximity discovery beacons and measure RSSI levels of those pairing proximity discovery beacons received from the wireless peripheral device 156. The RSSI collection pairing proximity discovery beacons or signals may be exchanged using a generic attribute profile (GATT) transmission such as under a BLE standard in some embodiments. This GATT transmission exchange may initiate a communication from the wireless peripheral device with each of the candidate host information handling systems 100, 190, and 192. Further, the pre-pairing host contention and arbitration agent 163 may cease responses or actions in response to any pairing request if instructed by the wireless peripheral device 156 and, thus, prevent notification of pairing request from being presented on a display device 146 of any information handling systems (e.g., 190 and 192) not selected for pairing in embodiments herein. In an embodiment, peripheral device microcontroller 158 and a hardware processor 102, embedded controller 104, or other hardware processor at each of information handling system 100, second information handling system 190, third information handling system 192 causes each of the information handling system 100, second information handling system 190, third information handling system 192 to independently determine RSSI levels of plural pairing proximity discovery beacons exchanged with wireless peripheral device 156 for accuracy. Further, different signal power levels of the pairing proximity beacons may verify accuracy over potential large object reflections as well as filter out further candidate host information handling systems. These sets of pairing proximity discovery beacons are sent in a staggered time to each of the candidate host information handling system 100, then to second candidate host information handling system 190, and then to the third candidate host information handling system 192 in an example embodiment to avoid collision. Further, the wireless peripheral device 156 will determine RSSI levels for a pairing proximity discovery beacon received from each of candidate host information handling system 100, second candidate host information handling system 190, and third candidate host information handling system 192 which may be used for further verify proximity distance estimations and to avoid errors such as from reflection and the like.

These RSSI levels are then shared from each of the wireless peripheral device 156 and information handling system 100, second information handling system 190, third information handling system 192 with each other via peer-to-peer connectivity or even with a common, networked information system such as secure local network server 143 via a secure communication in some embodiments. The secure local network server 143 may be executing code instructions of a pre-pairing host contention and arbitration agent 163 to determine proximity distances based on pathloss determination from pairing proximity beacon RSSI measurements in an embodiment. In some embodiments, a secure local network server 143 is not specifically required, and peer-to-peer sharing of RSSI levels may take place via a secure local network protocol, to broadcast shared RSSI levels among the information handling system 100, second information handling system 190, and third information handling system 192 any one or more of which may execute code instructions of a pre-pairing host contention and arbitration agent 163 to determine proximity distances based on pathloss determination from pairing proximity beacon RSSI measurements in an embodiment. In such a broadcast environment, a user datagram protocol (UDP) networked connection broadcast may be made whereby the UDP broadcast does not need to know receiver addresses providing for a self-rule communication of selecting a closes information handling system by this broadcasting on the secure UDP network rather than requiring an address specific connection. In another embodiment, these RSSI levels are shared from each of information handling system 100, second information handling system 190, third information handling system 192 to the wireless peripheral device 156 executing code instructions of the pre-pairing host contention and arbitration module 162 to determine proximity distances based on pathloss determination from the RSSI measurements. Using the wireless peripheral device 156 to determine distances may depend on whether a secure link to a secure local network server 143 or peer-to-peer network broadcast link among information handling systems for the RSSI levels to be shared from each of the wireless peripheral device 156 and information handling system 100, second information handling system 190, third information handling system 192 exists or whether the wireless peripheral device 156 has sufficient computing power at peripheral device microcontroller 158 in some embodiments. A secure link to the secure local network server 143 or via peer-to-peer communication network may be made via a UDP networked connection in an example embodiment that is secured via various authentication techniques.

The execution of code instructions of the pre-pairing host contention and arbitration module 162 at the wireless peripheral device 156 or the pre-pairing host contention and arbitration agent 163 at a secure local network server location 143 or via peer-to-peer network at one or more of the candidate host information handling systems 100, 190, and 192 to determine proximity distances of the candidate host information handling systems 100, 190, and 192 is determined from a three-factor RSSI signal exchange of pairing proximity beacons between wireless peripheral device 156 and each of information handling system 100, second information handling system 190, third information handling system 192 with RSSI measurements made on the three signals exchanged in an embodiment. These three-factor RSSI signal exchange levels are used to determine a pathloss value from the transmitted level and via a table or calculations. The pathloss levels may further be used to determine proximity distances between the wireless peripheral device 156 and each of information handling system 100, second information handling system 190, third information handling system 192 in an embodiment.

In a further embodiment, one or more of the information handling system 100, second information handling system 190, or third information handling system 192 may be filtered out by the wireless peripheral device transmitting a lower signal level signal, such as at −4 dB, to each of the information handling system 100, second information handling system 190, or third information handling system 192 and not receiving a response after a timeout period in an embodiment. This may be done by execution of code instructions of the pre-pairing host contention and arbitration module 162 at the wireless peripheral device 156 which may determine, as an initial matter, that such a non-responding information handling system is beyond range of this lower level signal (e.g., greater than 1 meter away) in an embodiment. The execution of code instructions of the pre-pairing host contention and arbitration module 162 at the wireless peripheral device 156 and may transmit a command to the non-responding information handling system as an initial matter to cease responding to requests to pair at a regular signal level in an embodiment. As a further security measure, the execution of code instructions of the pre-pairing host contention and arbitration module 162 at the wireless peripheral device 156 may not accept pairing from such a non-responding information handling system in some embodiments.

Upon determination of a closest candidate host information handling system, such as 100, from among the candidate host information handling systems 100, 190, and 192, execution of code instructions of the pairing module 164 at the wireless peripheral device 156 may initiate and request pairing with the selected candidate host information handling system 100 in an embodiment. At this point, a notification of pairing request may be allowed at the selected candidate host information handling system 100 by execution of code instructions of the pre-pairing host contention and arbitration agent 163 and a request is sent from the wireless peripheral device 156 by the pairing module 164. The notification of pairing request will then be displayed on the video display device 146 of the selected candidate host information handling system 100 or plural candidate host information handling systems if one is not the clear winner. In some embodiments, some portion of the remaining candidate host information handling systems may be too close to differentiate distances by enough of a threshold difference amount such that notification of pairing request may then be allowed at plural selected candidate host information handling systems by execution of code instructions of the pre-pairing host contention and arbitration agent 163. Such notification of pairing requests may be displayed on the video display device 146 at each of the plural selected candidate host information handling systems. In this case, a user may then make a selection among a fewer number of selected candidate host information handling systems in the congested workspace and that plurality of close candidate host information handling systems may be close to the user who is in possession of the wireless peripheral device 156 in embodiments herein. This may occur, for example, when a user has a smartphone and a laptop on her desk which are both close to the user and under control of the user. Instructions for a gesture, such as a selection of a button or keystroke on wireless peripheral device 156, may be displayed for selection by the user in an example embodiment to pick among the selected plurality of candidate information handling systems in some embodiments. Thus, security risk is still mitigated and annoyance of raising pairing notifications on neighboring user's information handling systems is also reduced. Since a finally selected, close candidate information handling system may only selected on the wireless peripheral device 156 and not based on just any peripheral device input connected to each candidate information handling system, a pairing security risk of pairing with an incorrect candidate host information handling system is further avoided in some embodiments.

If pairing is accepted by a user, then the wireless peripheral device 156 executes further code instructions of a pairing module 164 and the selected host information handling system 100 may broadcast the pairing beacon and establish further GATT communications in order to pair the wireless peripheral device 156 with the selected candidate host information handling system 100. In an embodiment, the wireless peripheral device 156 may initiate further pairing communication with the information handling system 100 also using a GATT communication protocol. In an embodiment, the first wireless peripheral device 156 may broadcast the pairing request and exchange of credentials to the information handling system 100 that includes, among other data, identification data and exchange of authentication credentials, gesture HID data, pairing codes, or seed data or other data to determine pairing codes via parallel hashing algorithms at both sides. The GATT communications, and eventually paired Bluetooth® and BLE communications may occur from the wireless peripheral device via a wireless peripheral device radio 172 and wireless peripheral device front end 174 with peripheral device antenna 176 to antenna 136, RF front end 134 and radio 132 of the wireless interface adapter 130 of the information handling system 100.

The exchange of pairing codes or verification of pairing codes on the information handling system 100 and wireless peripheral device 156 sides by execution of the pairing module 164 may require manual entry of codes, touchless or hash-based verification, or gestures indicating that the codes shown on both the wireless peripheral device 156 and the selected candidate host information handling system 100 match. Successful performance of a gesture-based pairing operation on the wireless peripheral device 156 as instructed on the selected host candidate information handling system, or other manual or touchless pairing code verification techniques including exchange of seed values and execution of hash loop functions to generate codes for matching on both sides may be used in various embodiments herein. In an example embodiment, the wireless peripheral device 156 executing the pairing module 164 may transmit seed data to be used, concurrently, by both the hardware processor 102, EC 104 or other hardware processing resource of the selected candidate information handling system 100 and the peripheral device microcontroller 158 of the wireless peripheral device 156 to generate secure passcodes to be used for pairing the wireless peripheral device 156 with the selected, candidate host information handling system 100. For example, the passcodes may be generated by execution of code instructions of the hashloop algorithm and passcode 166 via seed data and other shared input data on the wireless peripheral device 156 and a counterpart on the selected candidate host information handling system 100. In an embodiment, one or more seed values may be generated by the peripheral device microcontroller 158 using, for example, a random number generator (RNG) and sent to the selected candidate host information handling system 100 for generation of the secure passcode there for pairing. In this way, the pairing process may achieve a satisfactory level of security for pairing under the Bluetooth® or BLE protocols.

In order to communicate with the information handling system 100, second information handling system 190, or third information handling system 192 in a workspace, the wireless peripheral device 156 includes a wireless peripheral device radio 172, a wireless peripheral device RF front end 174, and a wireless peripheral device antenna 176. These the wireless peripheral device 156 to transceive data to and from the wireless interface adapter 130 of the information handling system 100 via an antenna 136 and similar on second information handling system 190, or third information handling system 192, or others in a workspace. In an embodiment, these transceptions between the wireless peripheral device 156, and candidate host information handling systems 100, 190, and 192 may be Bluetooth® or BLE® wireless, or other WPAN or WLAN communications that operate under those radio frequencies associated with those transception protocols.

In an embodiment, the wireless peripheral device 156 further includes a peripheral device PMU 168 and may include hardware controllers and executable machine-readable code instructions to manage the power provided to the components of the first wireless peripheral device 156 such as the peripheral device microcontroller 158 and other hardware components described herein. In an embodiment, the PMU 168 may monitor power levels. The PMU 168 may regulate power from a power source such as the wireless peripheral device battery 170. In an embodiment, the battery 170 may provide power to the components of the wireless peripheral device 156 via wired connections formed on, for example, a printed circuit board (PCB) within the wireless peripheral devices 156.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
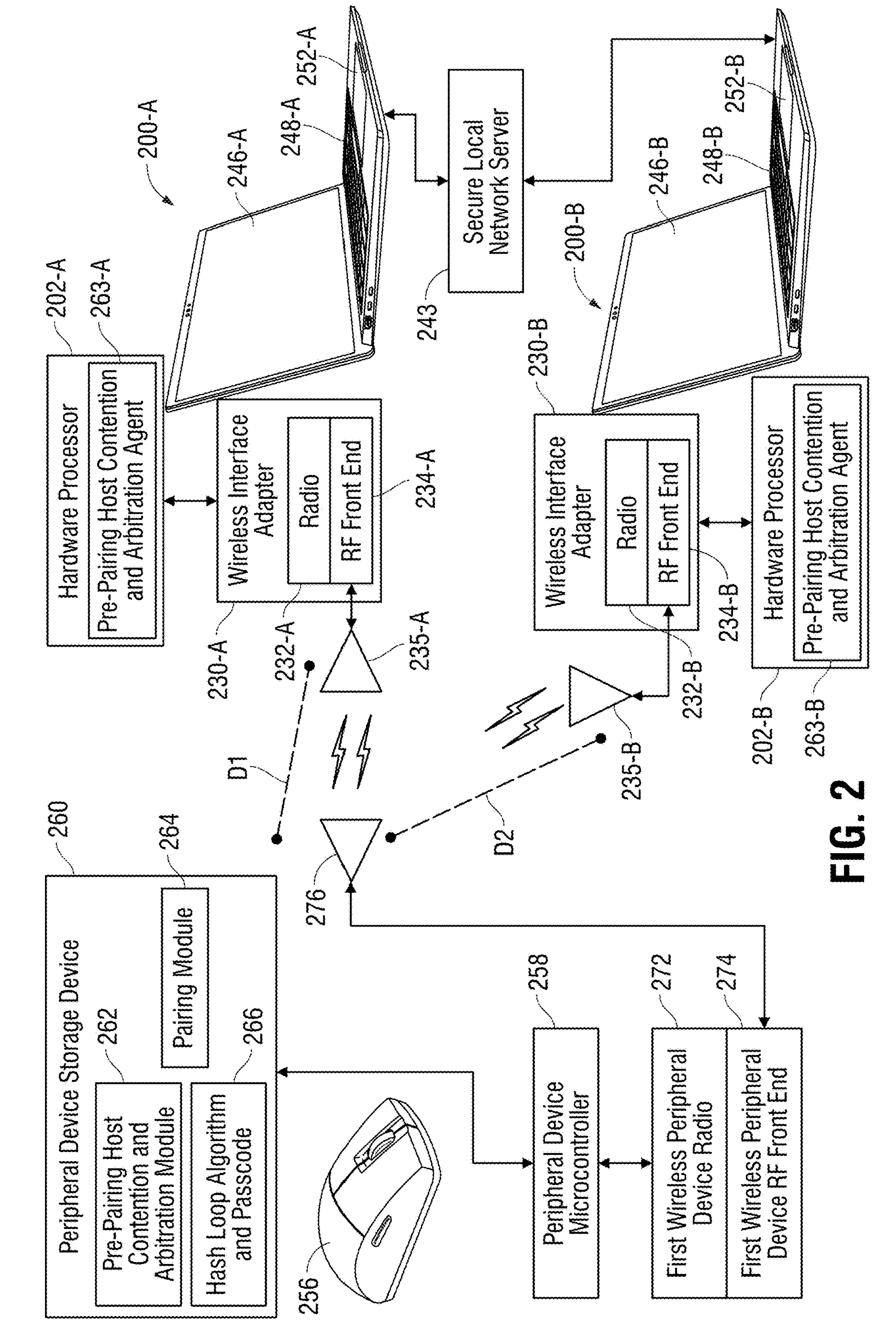
FIG. 2 is a graphic and block diagram illustrating a wireless peripheral device and a plurality of candidate host information handling systems in a workspace that may be selected via execution of code instructions for a pre-pairing host contention and arbitration module for pairing and operative coupling to the wireless peripheral device according to an embodiment of the present disclosure.

FIG. 2 is a graphic and block diagram illustrating wireless peripheral device 256 that may be operatively coupled within a congested workspace that includes a first candidate host information handling system 200-A at a first distance D1 and a second candidate host information handling system 200-B at a second distance D2 according to an embodiment of the present disclosure. It is contemplated that any plurality of candidate host information handling systems may be in the congested workspace of FIG. 2. Further, FIG. 2 shows that the candidate host information handling systems 200-A and 200-B are laptop-type information handling systems, but it is appreciated that the candidate host information handling systems 200-A and 200-B may be any type of information handling systems including smartphones and other types according to embodiments herein. Each of the candidate host information handling systems 200-A and 200-B of FIG. 2 also shows a built-in keyboard 248-A and 248-B and trackpad 252-A and 252-B that allow the user to provide input to the respective candidate host information handling systems 200-A and 200-B. Moreover, in some embodiments candidate host information handling systems 200-A and 200-B may each be operatively coupled to a common secure network of the enterprise such as via a user datagram protocol (UDP) connection that is peer-to-peer or to a secure local network server 243. In other embodiments, the one or more of the candidate host information handling systems 200-A and 200-B may not have access to the peer-to-peer network or a secure local network server 243.

Additionally, FIG. 2 shows a wireless mouse as the wireless peripheral device 256. It is appreciated that the wireless peripheral device 256 may be any type of wireless peripheral device such as a wireless keyboard, wireless stylus, a wireless video display device, a wireless trackpad, and the like and the wireless mouse is merely an example of wireless peripheral devices that can be wireless coupled to a selected one of the candidate host information handling systems 200-A and 200-B.

In order to communicate with candidate host information handling systems 200-A and 200-B or other candidate host information handling systems in the congested workspace, the wireless peripheral device 256 includes a wireless peripheral device radio 272, a wireless peripheral device RF front end 274, and a wireless peripheral device antenna 276. These hardware components allow each of the wireless peripheral device 256 to transceive data to and from the wireless interface adapters 230-A and 230-B, each with its radio 232-A and 232-B and RF front end 234-A and 234-B of candidate host information handling systems 200-A and 200-B respectively via an antennas 235-A and 235-B. In an embodiment, these pre-paired and post pairing radiofrequency transmissions and receptions between the wireless peripheral device 256 and candidate host information handling systems 200-A and 200-B or other candidate host information handling systems may be Bluetooth® or BLE® wireless, or other WPAN or WLAN communications using a GATT protocol and that operate under those radio frequencies associated with those transception protocols.

As described herein, the wireless peripheral device 256 may be operatively and wirelessly couplable to any of candidate host information handling systems 200-A and 200-B in a crowded or congested workspace environment. Again, this wireless coupling may include a pairing step that includes initial communications from the wireless peripheral device 256 that seeks initiation of a pairing with one of candidate host information handling systems 200-A and 200-B in the congested workspace in an embodiment. Prior to pairing, the wireless peripheral device 256 engages in a pre-pair host contention and arbitration process with the plurality of candidate host information handling systems 200-A and 200-B to determine an intended host information handling system according to embodiments of the present disclosure. The congested workspace may include to any number of candidate host information handling systems 200-A and 200-B as described in embodiments herein.

To minimize invoking pairing request notifications between the wireless peripheral device 256 and too many of candidate host information handling system 200-A, a second candidate host information handling system 200-B, and any other candidate host information handling systems in the congested workspace, the peripheral device microcontroller 258 executes code instructions of a pre-pairing host contention and arbitration module 262 upon initiation of the wireless peripheral device 256. Before commencing attempts to pair with the information handling system 200-A, the second information handling system 200-B, or other candidate host information handling systems within radio range of wireless peripheral device antenna 276, the execution of code instructions of a pre-pairing host contention and arbitration module 262 operates to filter out candidate host information handling systems 200-A and 200-B. The execution of code instructions of a pre-pairing host contention and arbitration module 262 operates to determine an intended candidate host information handling system for pairing based on proximity to the wireless peripheral device 256 in embodiments herein.

The systems and methods described in embodiments herein allow for a wireless peripheral device 256 pairing for a first time in a workspace to automatically determine pairing proximity distances from the wireless peripheral device 256 to any nearby candidate host information handling systems 200-A and 200-B. These pairing proximity distances are determined via measured received signal strength indicator (RSSI) levels determined from plural communications of pairing proximity beacons exchanged between the wireless peripheral device 256 and candidate host information handling systems 200-A and 200-B in embodiments. Plural communications of pairing proximity beacons include a lower power communication of a pairing proximity beacon used to improve accuracy of the estimated pairing proximity distances and reject errant data to determine if any of candidate host information handling systems 200-A and 200-B are beyond a threshold pairing proximity distance as an initial matter. Exchange of multiple communications of pairing proximity beacons is further used to determine more accurate pairing proximity distances, such as D1 and D2 and assess proximity of remaining candidate information handling systems after initial elimination, if that occurs. This is done to further eliminate candidates based on the pairing proximity distances D1 and D2 determined from those RSSI measurements of plural pairing proximity discovery beacons exchanged in embodiments herein. Exchanged plural pairing proximity beacons between the wireless peripheral device 256 and each remaining plurality of candidate host information handling system 200-A and 200-B that were not eliminated in the preliminary filtering may further reduce the number of remaining candidate host information handling systems 200-A and 200-B to one intended candidate host information handling system based on one candidate host information handling system being substantially closer than the others. In some embodiments, however, no "clear winner" of pairing proximity distance closeness emerges. Although a user may then select an intended candidate host information handling system, this pre-pairing host contention and arbitration module may still filter down the number of candidate host information handling systems 200-A and 200-B for pairing in a congested workspace in embodiments herein.

Execution of code instructions of a pre-pairing host contention and arbitration agent on a secure local network 243 that is securely and operatively coupled to each of the candidate host information handling systems 200-A and 200-B is used in some embodiments to determine relative proximity distances D1 and D2 based on pathloss levels from any remaining candidate information handling systems 200-A and 200-B not initially eliminated. In other embodiments, a secure local network server 243 is not specifically required, and peer-to-peer sharing of RSSI levels may take place via a secure local network protocol, to broadcast shared RSSI levels among the information handling systems 200-A, 200-B, and any others, any one or more of which may execute code instructions of a pre-pairing host contention and arbitration agent 263-A or 263-B to determine proximity distances of remaining candidate host information handling systems 200-A, 200-B or others based on pathloss determination from pairing proximity beacon RSSI measurements in an embodiment. If one candidate host information handling system 200-A is determined to be closer to the wireless peripheral device 256 by at or more than a threshold proximity distance difference amount, it may be determined as the "clear winner" and the intended candidate host information handling system 200-A. The threshold proximity distance difference amount relates to comparison of D1 to D2 to determine that the difference of those distances reaches or exceeds a threshold difference amount of distance. If so, the closer candidate host information handling system 200-A is then deemed closer by a threshold difference amount over the pairing proximity distances of the second information handling system 200-B or others in embodiments herein. When one "clear winner" candidate host information handling system 200-A is determined as closest by execution of code instructions of pre-pairing host contention and arbitration module on the wireless peripheral device 256 or a pre-pairing host contention and arbitration agent on a secure local network 243 or via peer-to-peer secure network broadcast, the wireless peripheral device which invokes a pairing module 264 to initiate pairing with the selected candidate host information handling system 200-A.

In an embodiment, this includes execution of code instructions of a pre-pairing host contention and arbitration agent 263-A by hardware processor 202-A to permit invoking of a notification of a request to pair on the display device 246-A at the selected candidate host information handling system 200-A. Then, the code instructions of the pre-pairing host contention and arbitration module 262 may send a message to the second candidate host information handling system 200-B and other non-selected host information handling systems to ignore or not respond to pairing requests from the wireless peripheral device 256 in embodiments herein. For example, the hardware processor 202-B may execute code instructions of pre-pairing host contention and arbitration agent 263-A to block or prohibit invoking of a notification of a request to pair at the non-selected candidate host information handling system 200-B. In some embodiments, where a secure local network 243 or a peer-to-peer network connection is unavailable to receive RSSI data from candidate host information handling systems 200-A and 200-B for the multiple communications of pairing proximity beacons for determination of proximity distance, the determination of pathloss for pairing proximity distances may be conducted by a peripheral device hardware microcontroller 258 or other hardware processing resource of wireless peripheral device 256 executing code instructions of the per-pairing host contention and arbitration module 262 instead. In some further, embodiments, the peripheral device hardware microcontroller 258 or other hardware processing resource of wireless peripheral device 256 executing code instructions of the per-pairing host contention and arbitration module 262 may receive RSSI information from candidate host information handling systems 200-A and 200-B for determination of pathloss for proximity distances in a first instance.

Each of the candidate host information handling systems 200-A and 200-B may execute code instructions of the pre-pairing host contention and arbitration agent 263 to receive and send pairing proximity discovery beacons and measure RSSI levels of those pairing proximity discovery beacons received from the wireless peripheral device 256. The RSSI collection pairing proximity discovery beacons or signals may be exchanged using a generic attribute profile (GATT) transmission such as under a BLE standard in some embodiments. This GATT transmission exchange may initiate a communication from the wireless peripheral device with each of the candidate host information handling systems 200-A and 200-B. Further, the pre-pairing host contention and arbitration agent 263 may block responses or actions in response to any pairing request if instructed by the wireless peripheral device 256 or secure local network server 243 or peer-to-peer via GATT messages in an embodiment. This prevents notification of pairing request from being presented on a display device 246-B when candidate host information handling system 200-B is not selected for pairing based on comparison of proximity distance D2 to proximity distance D1 in embodiments herein.

In an embodiment, peripheral device microcontroller 258 and a hardware processor 202-A or 202-B or other hardware processor at each candidate host information handling systems 200-A and 200-B causes each of the candidate host information handling systems 200-A and 200-B to independently determine and verify an RSSI level of pairing proximity discovery beacons exchanged with wireless peripheral device 256 at different signal power levels and in different directions to verify accuracy over potential large object reflections or other interferences during those exchanges. These sets of pairing proximity discovery beacons are sent in staggered time to each of the candidate host information handling systems. First a set of pairing proximity beacons are sent to first candidate host information handling system 200-A, then to second candidate host information handling system 200-B, and then to any other candidate host information handling systems in an example embodiment to avoid collision. This set of pairing proximity beacons includes transmission of a pairing proximity beacon from each of the candidate host information handling systems 200-A and 200-B to the wireless peripheral device 256. The wireless peripheral device 256 will determine RSSI levels for the third pairing proximity discovery beacon received from each of first candidate host information handling system 200-A, second candidate host information handling system 200-B, or others, which may be used for to verify pairing proximity distances and to further avoid errors such as from reflection and the like.

These RSSI levels are shared from each of the candidate host information handling systems 200-A and 200-B and wireless peripheral device 256, where applicable, with the common, secure local network server information system 243 or peer-to-peer via secure local network among candidate host information handling systems 200-B and 200-B via a secure network communication, such as via a UDP secure network protocol. The secure local network server information system 243 or candidate host information handling systems 200-A and 200-B on the peer-to-peer network may be executing code instructions of pre-pairing host contention and arbitration agent to determine or calculate the proximity distances based on pathloss level determinations from the RSSI levels received there in an embodiment. In another embodiment, these RSSI levels are shared from each candidate host information handling systems 200-A and 200-B to the wireless peripheral device 256 executing code instructions of the pre-pairing host contention and arbitration module 262 to determine proximity distances based on pathloss determination via execution on the peripheral device microcontroller 258. Using the wireless peripheral device 256 to determine proximity distances may depend on whether a secure link to a common network information handling system such as secure local network server 243 or via a secure peer-to-peer link for the RSSI levels to be shared from each of the wireless peripheral device 256 and from candidate host information handling systems 200-A and 200-B exists in some embodiments. A secure link to the secure local network server 243 of for peer-to-peer broadcast among candidate host information handling systems 200-A and 200-B may be made via a UDP networked connection that is secured via various authentication techniques in an example embodiment.

The execution of code instructions of the pre-pairing host contention and arbitration module 262 at the wireless peripheral device 256 or the pre-pairing host contention and arbitration agent at a secure local network server location 243, peer-to-peer with candidate host information handling systems 200-A, 200-B, or some combination will determine and compare proximity distances of the candidate host information handling systems 200-A and 200-B in embodiments herein. A two-factor or a three-factor RSSI signal exchange of pairing proximity beacons between wireless peripheral device 256 and each of candidate host information handling systems 200-A and 200-B may be used by the pre-pairing host contention and arbitration module or agent in various embodiments. The RSSI measurements made on the three signals exchanged of the three-factor RSSI pairing proximity beacon signal exchange in an embodiment provides for additional opportunities to eliminate error and obtain accuracy of pairing proximity distances. These three-factor RSSI signal exchange levels or directions are used to determine a pathloss value from the transmitted signal level of the pairing proximity beacons via a table or calculations to determine proximity distances from pathloss between the wireless peripheral device 256 and each of the candidate host information handling systems 200-A and 200-B in an embodiment.

In a further embodiment, as described, one or more of the candidate host information handling systems 200-A and 200-B may be filtered out in an initial screening by the wireless peripheral device 256 transmitting a lower signal level signal, such as at −4 dB below a typical GATT transmission signal level, to each of the candidate host information handling systems 200-A and 200-B. By not receiving a response after a timeout period from a lower signal level pairing proximity beacon in an embodiment, execution of code instructions of the pre-pairing host contention and arbitration module 262 at the wireless peripheral device 256 which may determine, as an initial matter, that such a non-responding information handling system is beyond a proximity distance range according to embodiments herein. The proximity distance range of this lower level signal may be a non-responding candidate information handling system greater than 1 meter away in an example embodiment as set by the −4 dB signal power level. The execution of code instructions of the pre-pairing host contention and arbitration module 262 at the wireless peripheral device 256 and may then transmit an instruction to the non-responding candidate host information handling system to cease responding to requests to pair. This instruction may be sent at a regular GATT signal level to reach this initially-eliminated candidate host information handling system in an embodiment.

Upon determination of a closest candidate host information handling system, such as 200-A, which has a closest proximity distance D1 from among other candidate host information handling systems, such as 200-B, execution of code instructions of the pairing module 264 at the wireless peripheral device 256 may initiate and request pairing with the selected candidate host information handling system 200-A in an embodiment. At this point, a notification of pairing request may be allowed at the selected candidate host information handling system 200-A by execution of code instructions of the pre-pairing host contention and arbitration agent 263 there. The notification of pairing request will then be displayed on the video display device 246-A of the selected candidate host information handling system 200-B. In other embodiments, where one candidate host information handling system is not selected or a clear winner, plural candidate host information handling systems may be prompted to pair and a user to select among the plural candidate host information handling systems that are closest to the wireless peripheral device 256.

In some embodiments, of the remaining candidate host information handling systems, plural candidate host information handling systems may be too close to differentiate distances by enough of a threshold difference amount. For example, D1 and D2 may be within a difference threshold. Notification of a required selection or of a pairing request may be allowed at plural selected candidate host information handling systems by execution of code instructions of the pre-pairing host contention and arbitration agent 263-A or 263-B and displayed on the video display device 246-A or 246-B at each selected candidate host information handling systems. In this case, a user may then make a selection among a fewer number of selected candidate host information handling systems in the congested workspace all of which may be close to the user. The user should be in possession of the wireless peripheral device 256 in embodiments herein and may view the pairing notification on both close candidate host information handling systems 200-A and 200-B. Instructions for a gesture, such as a selection of a button or keystroke, on wireless peripheral device 256 as may be displayed in the pairing notification at video display device 246-A or 246-B for selection by the user, in some example embodiments, which may determine a user's pick among the selected plurality of candidate information handling systems 200-A or 200-B. In others, the user may select to accept a pairing request at the intended candidate information handling system of the close candidate host information handling systems 200-A and 200-B. Thus, security risk is still mitigated and annoyance of raising pairing notifications on too many neighboring user's information handling systems is also reduced.

If pairing is accepted by a user, then the wireless peripheral device 256 executes further code instructions of a pairing module 264 and the selected host information handling system 200-B may establish further GATT communications in order to pair the wireless peripheral device 256 with the selected candidate host information handling system 200-A. In an embodiment, the wireless peripheral device 256 may exchange pairing credentials and verify pairing passcodes with the selected information handling system 200-A. Pairing communications may include exchange, among other data, identification data, authentication credentials, gesture HID data, pairing codes, or seed data or other data to determine pairing codes via parallel hashing algorithms at both sides to determine that pairing code match and pairing is authorized. The exchange of pairing codes or verification of pairing codes on the information handling system 200-A and wireless peripheral device 256 sides by execution of the pairing module 264 may require manual entry of codes, touchless or hash-based verification, or gestures indicating that the codes shown on both the wireless peripheral device 256 and at the selected candidate host information handling system 200-A match. In another embodiment, touchless pairing code verification techniques including exchange of seed values and execution of hash loop functions to generate pairing codes for matching on both sides may be used in various embodiments herein. In an example embodiment, the wireless peripheral device 256 executing the pairing module 264 may transmit seed data to be used, concurrently, by both the hardware processor 202-A of the selected candidate information handling system 200-A and the peripheral device microcontroller 258 of the wireless peripheral device 256 to generate secure passcodes for verification of pairing the wireless peripheral device 256 with the selected, candidate host information handling system 200-A. For example, the passcodes may be generated by execution of code instructions of the hashloop algorithm and passcode 266 via seed data and other shared input data on the wireless peripheral device 256 and a counterpart on the selected candidate host information handling system 200-A. In this way, the pairing process may achieve a satisfactory level of security for pairing under the Bluetooth® or BLE protocols.

Figure 3A:
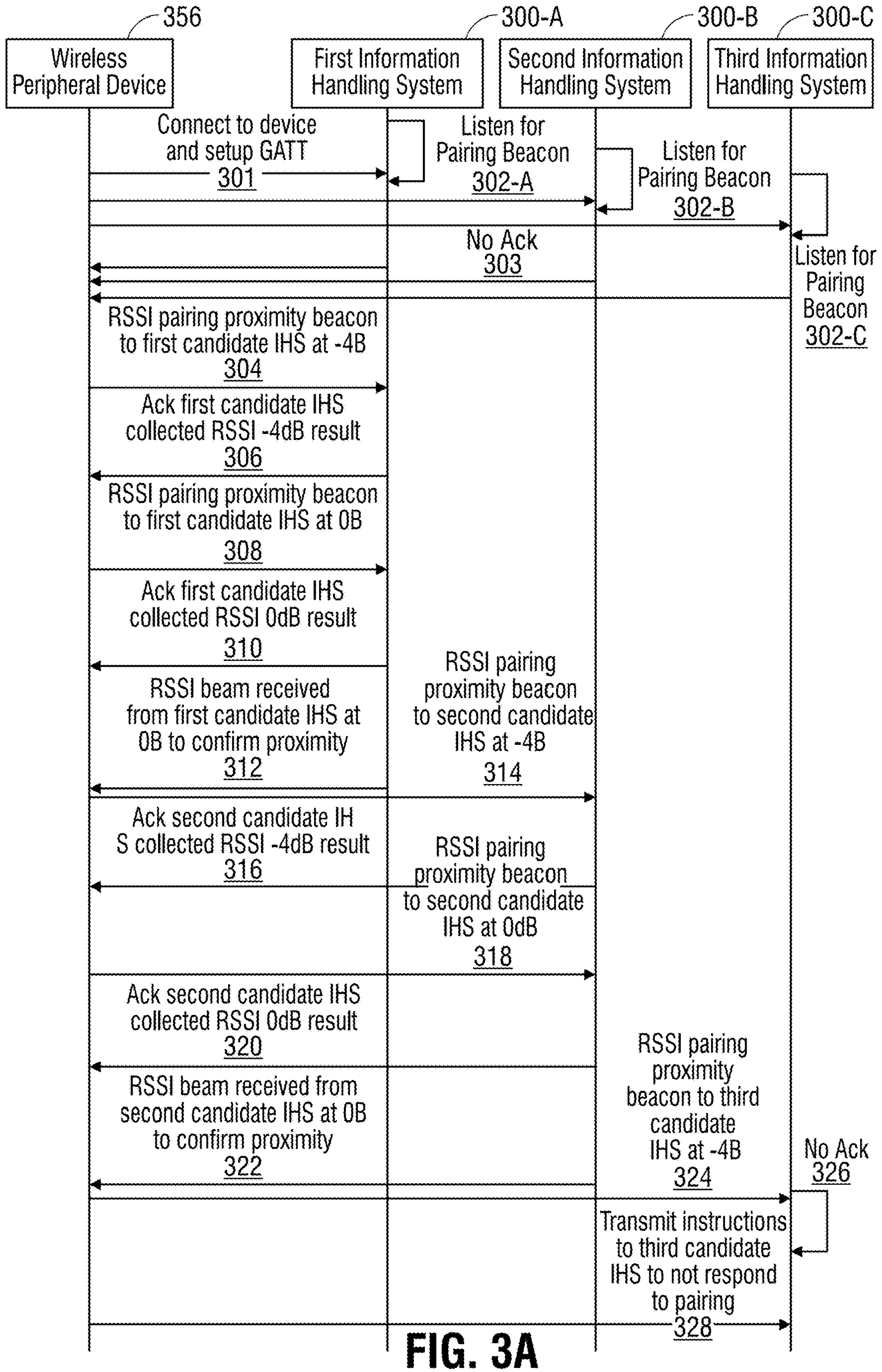
FIG. 3A is a flowchart showing a method of executing code instructions for a pre-pairing host contention and arbitration module to select for pairing to a wireless peripheral device among a plurality of candidate host information handling systems in a workspace according to an embodiment of the present disclosure.
Figure 3B:
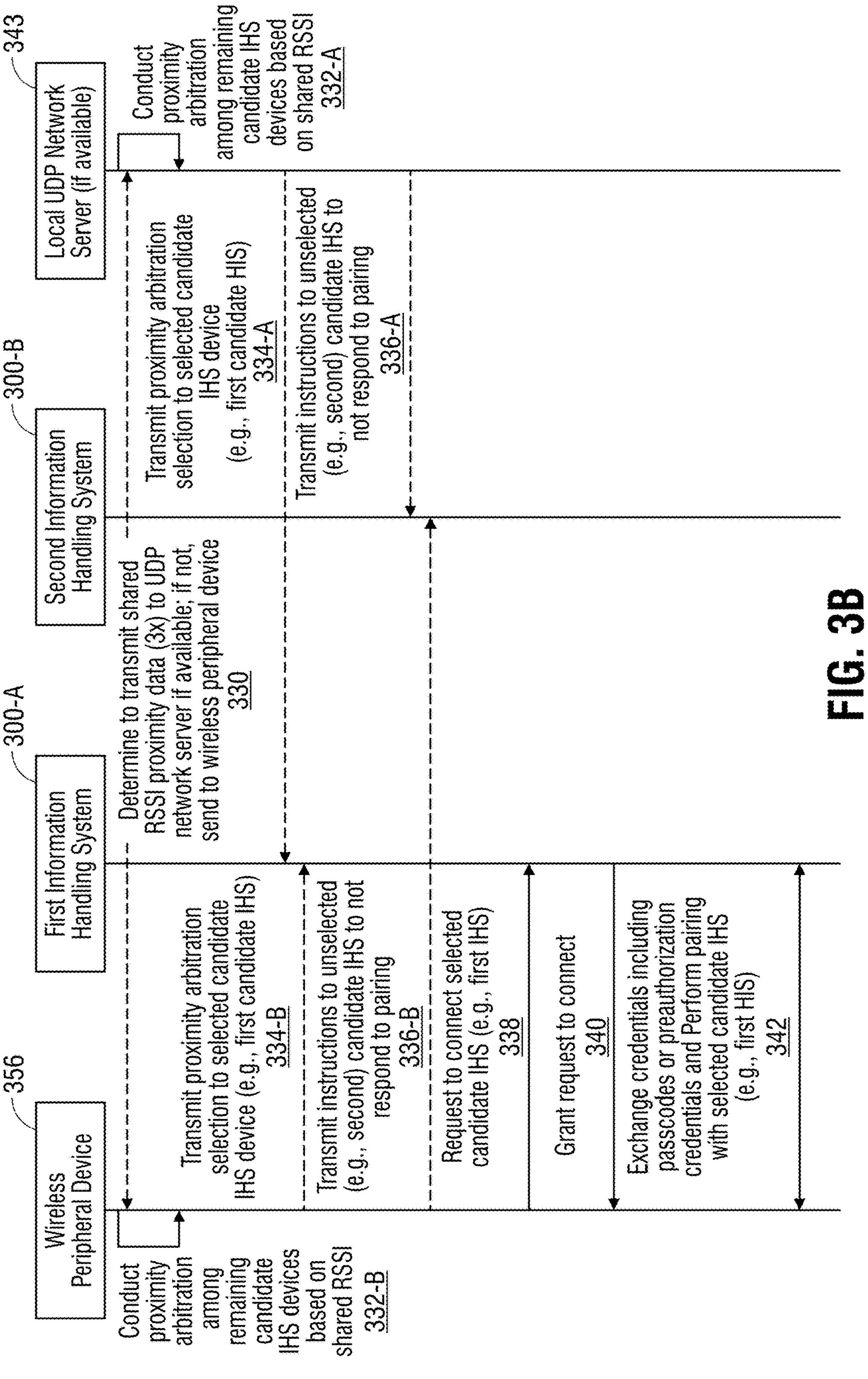
FIG. 3B is a continuation flowchart showing a method of executing code instructions for a pre-pairing host contention and arbitration module to select for pairing to a wireless peripheral device among a plurality of candidate host information handling systems in a workspace according to an embodiment of the present disclosure.

FIG. 3A is a swim lane flowchart showing a method of pairing a wireless peripheral device such as wireless peripheral device 356 in a congested workspace environment with a plurality of candidate host information handling systems 300-A, 300-B, and 300-C according to an embodiment of the present disclosure. FIG. 3B is a swim lane flowchart showing continuation of the method of pairing the wireless peripheral device 356 in a congested workspace environment with a plurality of candidate host information handling systems 300-A, and 300-B as well as connectivity to a secure local network server 343 to conduct proximity distance determination, if available, or to conduct proximity distance determination at wireless peripheral device 356 according to an embodiment of the present disclosure. In other embodiments of FIG. 3B, a secure local network server 343 is not specifically used, and peer-to-peer sharing of RSSI levels may take place via a secure local network protocol, to broadcast shared RSSI levels among the remaining first candidate host information handling system 300-A, second candidate host information handling system 300-B any one or more of which may execute code instructions of a pre-pairing host contention and arbitration agent to determine proximity distances of remaining candidate host information handling systems 300-A and 300-B based on pathloss determination from pairing proximity beacon RSSI measurements in an embodiment. It is appreciated that, although FIG. 3A and FIG. 3B show a wireless peripheral device 356 and a first candidate host information handling system 300-A, a second candidate host information handling system 300-B, and a third candidate host information handling system 300-C, the systems and methods described herein apply to pre-pairing filtering among any number of candidate host information handling systems which may be more or fewer than those shown and described in FIG. 3A or FIG. 3B.

The method may include, at line 301, with the wireless peripheral device 356 setting up a GATT communication with any candidate host information handling systems 300-A, 300-B, and 300-C within wireless range in a congested workspace via a GATT broadcast upon initiation of the wireless peripheral device 356 in an embodiment. This GATT broadcast may be sent at a normal signal power level and received at each candidate host information handling systems 300-A, 300-B, and 300-C within wireless range of the wireless peripheral device 356. At 302-A, candidate host information handling system 300-A is listening for a pairing beacon, at 302-B candidate host information handling system 300-B is listening for a pairing beacon, and at 302-C candidate host information handling system 300-C is listening for a pairing beacon in the embodiment of FIG. 3. Each candidate host information handling system 300-A, 300-B and 300-C within wireless range responds with an acknowledgement (ACK) at 303.

Next the peripheral device microcontroller of the wireless peripheral device 356 executes code instructions of the pre-pairing host contention and arbitration module to begin staggered exchanges of RSSI pairing proximity beacons between the wireless peripheral device 356 and each candidate host information handling system 300-A, 300-B and 300-C that responded with an acknowledgement at 305. In a first exchange of pairing proximity beacons, the wireless peripheral device 356 will send two pairing proximity beacons to the first candidate host information handling system 300-A. At 304, the wireless peripheral device 356 will send a first pairing proximity beacon to the candidate host information handling system 300-A using GATT communications at signal power level reduced from a typical GATT communication power level (e.g., −4 dB). The first candidate host information handling system 300-A, being within a sufficient proximity distance to receive this reduced signal will respond at 306 with an acknowledgement in an embodiment. Next, the wireless peripheral device 356 will send a second pairing proximity beacon to the candidate host information handling system 300-A using GATT communications at signal power level that is a typical GATT communications power level (0 dB) at 308. The first candidate host information handling system 300-A will respond at 310 with an acknowledgement in an embodiment. These two proximity beacons transmitted at 304 and 308 are transmitted at different power levels to reduce errors that may occur due to reflections or other radiofrequency anomalies and used to provide plural RSSI data points for measuring pathloss levels for proximity distance determinations at the first candidate host information handling system 300-A. The pathloss determinations from the RSSI measurements may be correlated or used to determine proximity distance of the first candidate host information handling system 300-A from the wireless peripheral device 356.

As a further confirmation of RSSI between the wireless peripheral device 356 and the first candidate host information handling system 300-A, the first candidate host information handling system 300-A may send a third pairing proximity beacon to the wireless peripheral device 356 at 312. This third proximity beacon may be sent at a typical GATT communications power level (0 dB) in an embodiment. The third proximity beacon is received at the wireless peripheral device 356 at 312 and an RSSI level determined for an additional pathloss determination data point for determining the proximity distance to the first candidate host information handling system 300-A. The third proximity beacon RSSI measurement from a reverse-direction transmission also provides for an additional ability to reduce or correct for transmission or reception errors such as due to large object reflections and other issues. With three pairing proximity beacons exchanged, this may be referred to as a three-factor proximity distance determination in some embodiments herein. In other embodiments, the first two proximity beacons may only be used for proximity distance determination. In a further embodiment, the third proximity beacon may not be sent as a separate pairing proximity beacon at 312, but instead the acknowledgement sent from the first candidate host information handling system 300-A of the first or second pairing proximity beacons received at 306 or 310 may serve as the third proximity beacon with the wireless peripheral device 356 measuring RSSI of those acknowledgement responses in some example embodiments.

In a second exchange of pairing proximity beacons, the wireless peripheral device 356 will send two pairing proximity beacons to the second candidate host information handling system 300-B. At 314, the wireless peripheral device 356 will send a first pairing proximity beacon to the second candidate host information handling system 300-B using GATT communications at signal power level reduced from a typical GATT communication power level (e.g., −4 dB). The second candidate host information handling system 300-B, being within a sufficient proximity distance to receive this reduced signal will respond at 316 with an acknowledgement in an embodiment. Next, the wireless peripheral device 356 will send a second pairing proximity beacon to the second candidate host information handling system 300-B using GATT communications at signal power level that is a typical GATT communications power level (0 dB) at 318. The second candidate host information handling system 300-B will respond at 320 with an acknowledgement in an embodiment. These two proximity beacons transmitted at 314 and 318 are transmitted at different power levels to reduce errors that may occur due to reflections or other radiofrequency anomalies and used to provide plural RSSI data points for measuring pathloss from the second candidate host information handling system 300-B. The pathloss determinations from the RSSI measurements may be correlated or used to determine proximity distance of the second candidate host information handling system 300-B from the wireless peripheral device 356.

As a further confirmation of RSSI between the wireless peripheral device 356 and the second candidate host information handling system 300-B, the second candidate host information handling system 300-B may send a third pairing proximity beacon to the wireless peripheral device 356 at 322. This third proximity beacon may be sent at a typical GATT communications power level (0 dB) in an embodiment. The third proximity beacon is received at the wireless peripheral device 356 at 322 and an RSSI level determined for an additional pathloss determination data point for determining the proximity distance to the second candidate host information handling system 300-B. The third proximity beacon RSSI measurement is a reverse-direction transmission and provides for an additional ability to reduce or correct for transmission or reception errors such as due to large object reflections and other issues. With three pairing proximity beacons exchanged, this may be referred to as a three-factor proximity distance determination in some embodiments herein. In other embodiments, the first two proximity beacons may only be used for proximity distance determination. In a further embodiment, the third proximity beacon may not be sent as a separate pairing proximity beacon at 322, but instead the acknowledgement from the second candidate host information handling system 300-B of the first or second pairing proximity beacons received at 316 or 320 may serve as the third proximity beacon with the wireless peripheral device 356 measuring RSSI of those acknowledgement responses in some example embodiments.

In a third exchange of pairing proximity beacons, the wireless peripheral device 356 will send pairing proximity beacons to the third candidate host information handling system 300-C. At 324, the wireless peripheral device 356 will send a first pairing proximity beacon to the third candidate host information handling system 300-C using GATT communications at signal power level reduced from a typical GATT communication power level (e.g., −4 dB). In an embodiment, the third candidate host information handling system 300-C is not within a sufficient proximity distance to receive this reduced signal. At 326, the third candidate host information handling system 300-C does not respond to the wireless peripheral device 356 with an acknowledgement in an embodiment. This may occur in an example embodiment if the third candidate host information handling system 300-C is beyond an initial threshold proximity distance from the wireless peripheral device 356, such as greater than 1 meter away in a specific example.

The peripheral device microcontroller at the wireless peripheral device 356 will execute code instructions of the pre-pairing host contention and arbitration module to determine that a timeout timer has run and that no acknowledgement has been received from the third candidate host information handling system 300-C to the pairing proximity beacon sent at 324. The peripheral device microcontroller at the wireless peripheral device 356 will execute code instructions of the pre-pairing host contention and arbitration module to generate and send an instruction to cease responding to pairing communications at 328 to the third candidate host information handling system 300-C. This instruction to cease responding to pairing at 328 may use GATT communications at signal power level that is a typical GATT communications power level (0 dB). Code instructions of a pre-pairing host contention and arbitration agent at the third candidate host information handling system 300-C may execute to block and stop all further action in response to pairing communications from the wireless peripheral device 356 at this point. In this way, the code instructions of the pre-pairing host contention and arbitration module at the wireless peripheral device 356 achieve an initial filtering of the third candidate host information handling system 300-C as being too far away to be the intended candidate host information handling system. Pairing may stop, and no notifications of pairing will be displayed on the display screen of the third candidate host information handling system 300-C. This may improve security as well as provide improved user satisfaction. Further, this initial filtering of far away third candidate host information handling system 300-C may expedite pairing in the congested workspace according to some embodiments herein.

Continuing to FIG. 3B, additional host contention arbitration will be conducted via execution of code instructions of a pre-pairing host contention and arbitration module at the wireless peripheral device 356 or at a pre-pairing host contention and arbitration agent at a secure network location such as local secure UDP network server 338. When local secure network server or peer-to-peer network broadcast 343 is accessible and securely network linked to the remaining plurality of candidate host information handling systems 300-A and 300-B, RSSI measured values of exchanged sets of pairing proximity beacons may be transmitted to the local secure network server or peer-to-peer network broadcast 343 in an embodiment. In other embodiments, additional host contention arbitration will be conducted via execution of code instructions of the pre-pairing host contention and arbitration module at the wireless peripheral device 356 for the remaining plurality of candidate host information handling systems 300-A and 300-B. In one example embodiment, the additional host contention arbitration will execute in part at the local secure network server or peer-to-peer network broadcast 343 if it is available to all remaining plurality of candidate host information handling systems 300-A and 300-B or if the wireless peripheral device 356 has a hardware microcontroller unable to handle the pathloss determinations and proximity distances calculations.

At 330, the RSSI measurements resulting from the first pairing beacon, second pairing beacon and third pairing beacon are shared and transmitted to either the local secure network server or peer-to-peer network broadcast 343, if available, or to the wireless peripheral device 356 in various embodiments. The execution of code instructions of the pre-pairing host contention and arbitration module at the wireless peripheral device 356 or the pre-pairing host contention and arbitration agents at the local secure network server or peer-to-peer network broadcast 343 may gather the set of RSSI measurements from the remaining plurality of candidate host information handling systems 300-A and 300-B and the wireless peripheral device 356. In some embodiments, such as a two factor embodiment, RSSI measurements from only two pairing beacon transmissions may be used. In other embodiments, the RSSI measurements from exchange of three pairing beacons may be used.

The execution of code instructions of the pre-pairing host contention and arbitration module at the wireless peripheral device 356 will determine if each of the remaining plurality of candidate host information handling systems 300-A and 300-B has a secure UDP or other secure network connection to a local secure network server or peer-to-peer network broadcast 343. In such an example alternative embodiment and shown in a dashed line 330, the shared RSSI measurements resulting from the first pairing beacon, second pairing beacon and third pairing beacon will be transmitted from the remaining plurality of candidate host information handling systems 300-A and 300-B to the local network server 338 for determination of pathloss levels and estimation of proximity distances at 332-A. In another example alternative embodiment and shown in the dashed line at 330, the shared RSSI measurements resulting from the first pairing proximity beacon, second pairing proximity beacon and third pairing proximity beacon will be transmitted from the remaining plurality of candidate host information handling systems 300-A and 300-B to the wireless peripheral device 356 for determination of pathloss levels and estimation of proximity distances at 332-B.

Execution of code instructions of the pre-pairing host contention and arbitration module at the wireless peripheral device 356 or the pre-pairing host contention and arbitration agent at the local secure network server or peer-to-peer network broadcast 343 may determine pathloss levels and compare pathloss determinations from three-factor (or two-factor) RSSI measurements of the first pairing proximity beacon, second pairing proximity beacon, and third pairing proximity beacon at 332-A or 332-B. The pathloss level is determined for pairing proximity beacon sets for each of the remaining plurality of candidate host information handling systems 300-A and 300-B and used to estimate pairing proximity distances at 332-A or 332-B. If the proximity distance between the first candidate host information handling system 300-A and the wireless peripheral device 356 is closer than the proximity distance between of second candidate host information handling system 300-B by an amount of distance difference (or pathloss level difference) that exceeds a distance difference threshold (or pathloss level difference threshold), then the first candidate host information handling system 300-A may be selected as a "clear winner." The selected first candidate host information handling system 300-A is determined to have a closest pairing proximity distance indicating it is likely the intended pairing candidate host information handling system 300-A among the remaining plurality of candidate host information handling systems 300-A and 300-B. In some embodiments, discussed herein, no "clear winner" is determined from among a subset of remaining candidate host information handling systems and a notification for pairing may be raised on two or more close candidate host information handling systems for the user including an instruction to select among the subset of closest remaining candidate host information handling systems. The user, who is likely near and in possession of that subset of remaining close candidate host information handling systems, will be instructed to decide or accept one of them. This is discussed further in embodiments herein such as at FIGS. 5A and 5B below.

In some embodiments, the determination of pathloss levels and proximity distance or the comparison of the same may be executed at any combination of the local secure network server or peer-to-peer network broadcast 343 and the wireless peripheral device 356 and some portion or all results transmitted between the local secure network server or peer-to-peer network broadcast 343 and the wireless peripheral device 356 at 330. Upon determining that the first candidate host information handling system 300-A is selected as a "clear winner" having the closest proximity distance (or highest pathloss level) to the wireless peripheral device 356 above a difference threshold level, this proximity arbitration selection is transmitted to the selected first candidate host information handling system 300-A at line 334-B from the wireless peripheral device 356. In an embodiment, any portion of the proximity arbitration selection or determined pathloss or proximity distance calculations determined at the local secure network server or peer-to-peer network broadcast 343 may be transmitted to the wireless peripheral device 356 at 330. Then the proximity arbitration selection of the first candidate host information handling system 300-A as a "clear winner" selected for pairing may be transmitted to the selected first candidate host information handling system 300-A at 334-B. In yet another embodiment where the determination that the first candidate host information handling system 300-A is selected as a "clear winner" having the closest proximity distance (or highest pathloss level) to the wireless peripheral device 356 is determined at the local secure network server or peer-to-peer network broadcast 343 at 332-A, this proximity arbitration selection is transmitted to the selected first candidate host information handling system 300-A at line 334-A directly from the local secure network server or peer-to-peer network broadcast 343.

Similarly, for all other unselected candidate host information handling systems, such as second candidate host information handling system 300-B in the shown example embodiment, a notification is sent to those candidate host information handling systems, for example the unselected second candidate host information handling system 300-B, at lines 336-A or 336-B. Whether the local secure network server or peer-to-peer network broadcast 343 sends notice 336-A or the wireless peripheral device 356 sends notice 336-B depends on where determination of pathloss levels, proximity distances, and comparison location to select a "clear winner" candidate host information handling system occurs as described above. The notice transmitted to the other unselected remaining candidate host information handling systems at lines 336-A or 336-B, such as candidate host information handling system 300-B in embodiments herein, includes an instruction to cease pairing activity and not respond to pairing communications further. In this way, the code instructions of the pre-pairing host contention and arbitration module at the wireless peripheral device 356 achieves filtering of the remaining plurality of candidate host information handling systems 300-A and 300-B, as well as 300-C from an initial elimination. Accordingly, the code instructions of the pre-pairing host contention and arbitration module at the wireless peripheral device 356 to select one selected candidate host information handling systems 300-A as the intended candidate host information handling system for pairing with the wireless peripheral device 356 in a congested workspace in embodiments herein. Other candidate host information handling systems 300-B may be stopped from having any notification on the display screen, such as of the second candidate host information handling system 300-B, by the pre-pairing host contention and arbitration agent execution there. This may improve security as well as provide improved user satisfaction and may expedite processed for pairing in a congested workspace according to embodiments herein.

At line 340, the wireless peripheral device 356 may initiate the pairing process with the selected candidate host information handling system 300-A with a request to connect. A notification of a request to connect with the wireless peripheral device 356 may appear on a display screen the selected candidate host information handling system 300-A. If a user accepts, the selected candidate host information handling system 300-A may respond with a grant of the request to connect notification at line 342. Then the selected candidate host information handling system 300-A and the wireless peripheral device 356 may exchange pairing credentials including pairing passcodes, verification that pairing passcodes have been generated or appear at both sides using preauthorization credentials for example, or some type of gesture or other input to verify matching pairing passcodes according to various embodiments and in accordance with security requirements of the Bluetooth® or BLE pairing protocols according to embodiments herein.

Figure 4:
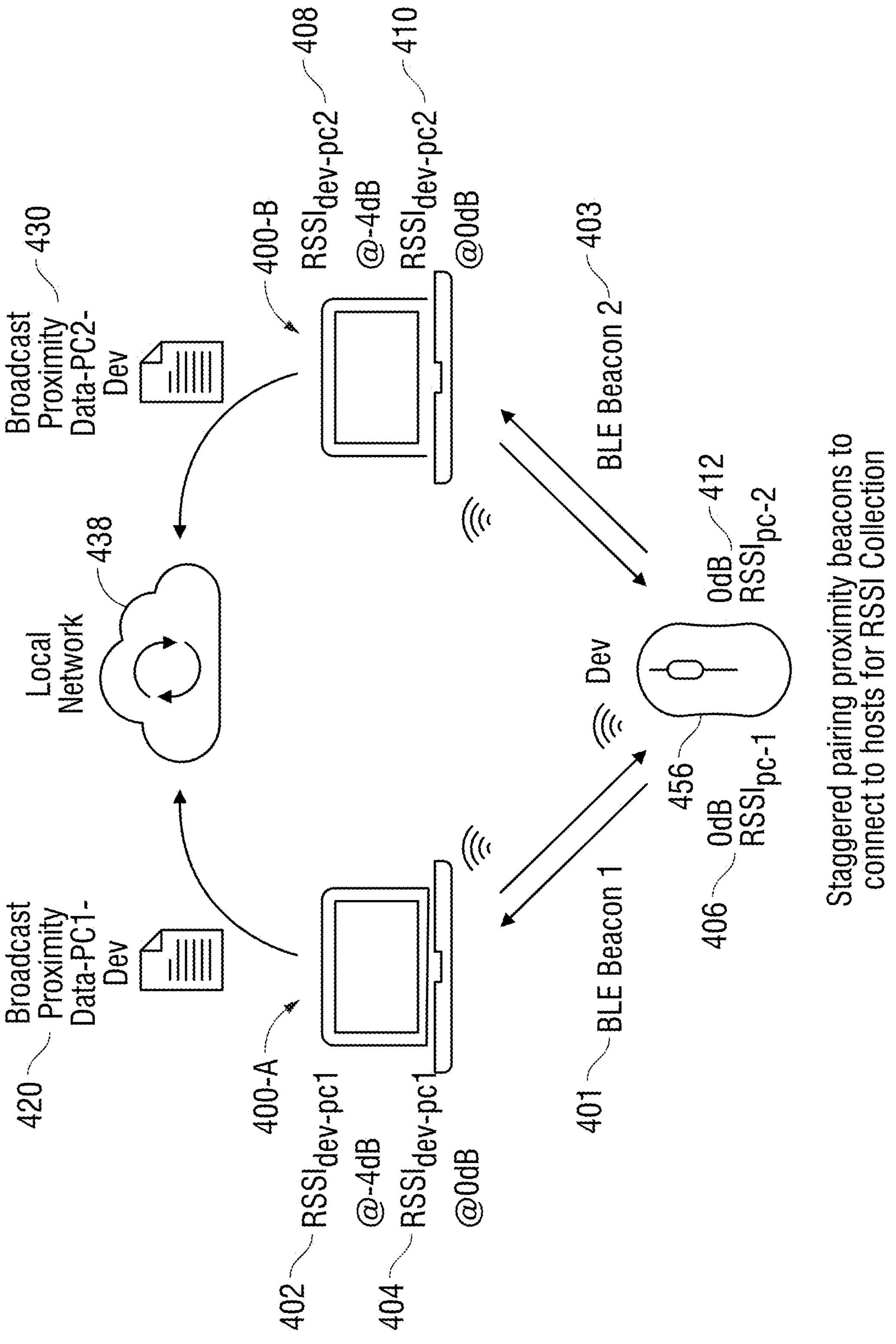
FIG. 4 is a block diagram illustrating a wireless peripheral device selecting among a plurality of candidate host information handling systems networked in a workspace using a pre-pairing host contention and arbitration module according to an embodiment of the present disclosure.

FIG. 4 is a block diagram illustrating a wireless peripheral device 456 in a crowded workspace environment with two candidate host information handling systems 400-A and 400-B and a staggered exchange of two or more proximity pairing beacons between the wireless peripheral device 456 and two candidate host information handling systems 400-A and 400-B according to an embodiment of the present disclosure. As shown, the wireless peripheral device 456 may first send and receive a set of BLE proximity pairing beacons 401 in an embodiment. The set of BLE proximity pairing beacons 401 in this first of the staggered exchanges includes one proximity pairing beacon transmitted from the wireless peripheral device 456 to the first candidate host information handling system 400-A at a reduced signal power level of −4 dB for determination of an RSSI level 402 at the first candidate host information handling systems 400-A. The set of BLE proximity pairing beacons 401 in this first of the staggered exchanges includes a second proximity pairing beacon transmitted from the wireless peripheral device 456 to the candidate host information handling system 400-A at a regular signal power level of 0 dB for determination of an RSSI level 404 at the first candidate host information handling systems 400-A. The set of BLE proximity pairing beacons 401 in this first of the staggered exchanges includes a third proximity pairing beacon transmitted from the first candidate host information handling system 400-A to the wireless peripheral device 456 to at regular signal power level of 0 dB for determination of an RSSI level 406 at the wireless peripheral device 456.

Next, the wireless peripheral device 456 may send and receive a second set of BLE proximity pairing beacons 403 in an embodiment. The second set of BLE proximity pairing beacons 403 in this second of the staggered exchanges includes one proximity pairing beacon transmitted from the wireless peripheral device 456 to the second candidate host information handling system 400-B at a reduced signal power level of −4 dB for determination of an RSSI level 408 at the second candidate host information handling systems 400-B. The second set of BLE proximity pairing beacons 403 in this second of the staggered exchanges includes a second proximity pairing beacon transmitted from the wireless peripheral device 456 to the second candidate host information handling system 400-B at a regular signal power level of 0 dB for determination of an RSSI level 410 at the second candidate host information handling systems 400-B. The second set of BLE proximity pairing beacons 403 in this second of the staggered exchanges includes a third proximity pairing beacon transmitted from the second candidate host information handling system 400-A to the wireless peripheral device 456 to at regular signal power level of 0 dB for determination of an RSSI level 412 at the wireless peripheral device 456.

According to embodiments herein, the RSSI levels 402, 404, 406, 408, 410, and 412 for the exchanged pairing proximity beacon sets 401 and 403 may be shared at a single location such as wireless peripheral device 456 or via a local secure peer to peer network or network server location 438. The collected and shared RSSI levels 402, 404, 406, 408, 410, and 412 for the exchanged pairing proximity beacon sets 401 and 403 are used for pathloss determination or related proximity distances between the wireless peripheral device 456 and the first candidate host information handling system 400-A and between the wireless peripheral device 456 and the second candidate host information handling system 400-B. These proximity distances may then be compared according to embodiment herein. Execution of code instructions of the pre-pairing host contention and arbitration module at the wireless peripheral device 456, the pre-pairing host contention and arbitration agents at the candidate host information handling systems 400-A and 400-B, via local secure peer to peer network or network server location 438, or some combination may be used to determine a clear winner of closest proximity distance, if any, for selection among candidate host information handling systems 400-A and 400-B for pairing with the wireless peripheral device 456 according to embodiments herein. FIG. 4 shows an embodiment that when the local secure peer to peer network or network server location 438 is available to all remaining candidate host information handling systems 400-A and 400-B after any initial filtering of far away candidate hosts, measured RSSI levels 402, 404, 406, 408, 410, and 412 for the exchanged pairing proximity beacon sets 401 and 403 may be transmitted at 420 and 430 as broadcast proximity data from the candidate host information handling systems 400-A and 400-B to the local secure peer to peer network or network server location 438. In such an embodiment, some or all of the determination of and comparison of pathloss levels or proximity distances may occur at any of the local secure peer to peer network or network server location 438, wireless peripheral device 456, or a combination. Selection of one or more candidate host information handling systems 400-A and 400-B for pairing with the wireless peripheral device 456 may then successfully filter out some candidate host information handling systems in a congested workspace environment according to embodiments herein.

Figure 5A:
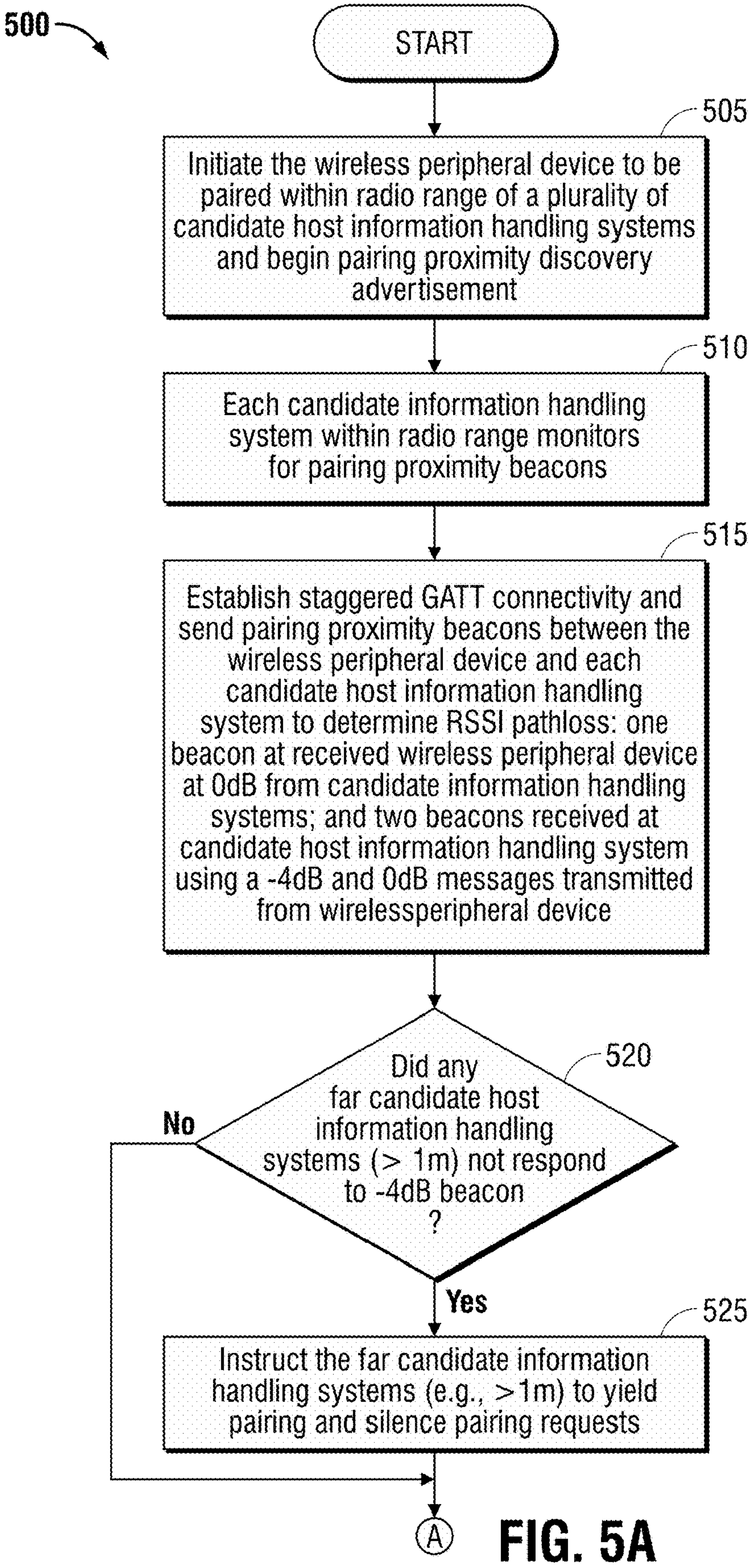
FIG. 5A is a flowchart and FIG. 5B is a continuation flow chart showing a method of a wireless peripheral device selecting among a plurality of candidate host information handling systems in a workspace using a pre-pairing host contention and arbitration module according to an embodiment of the present disclosure.
Figure 5B:
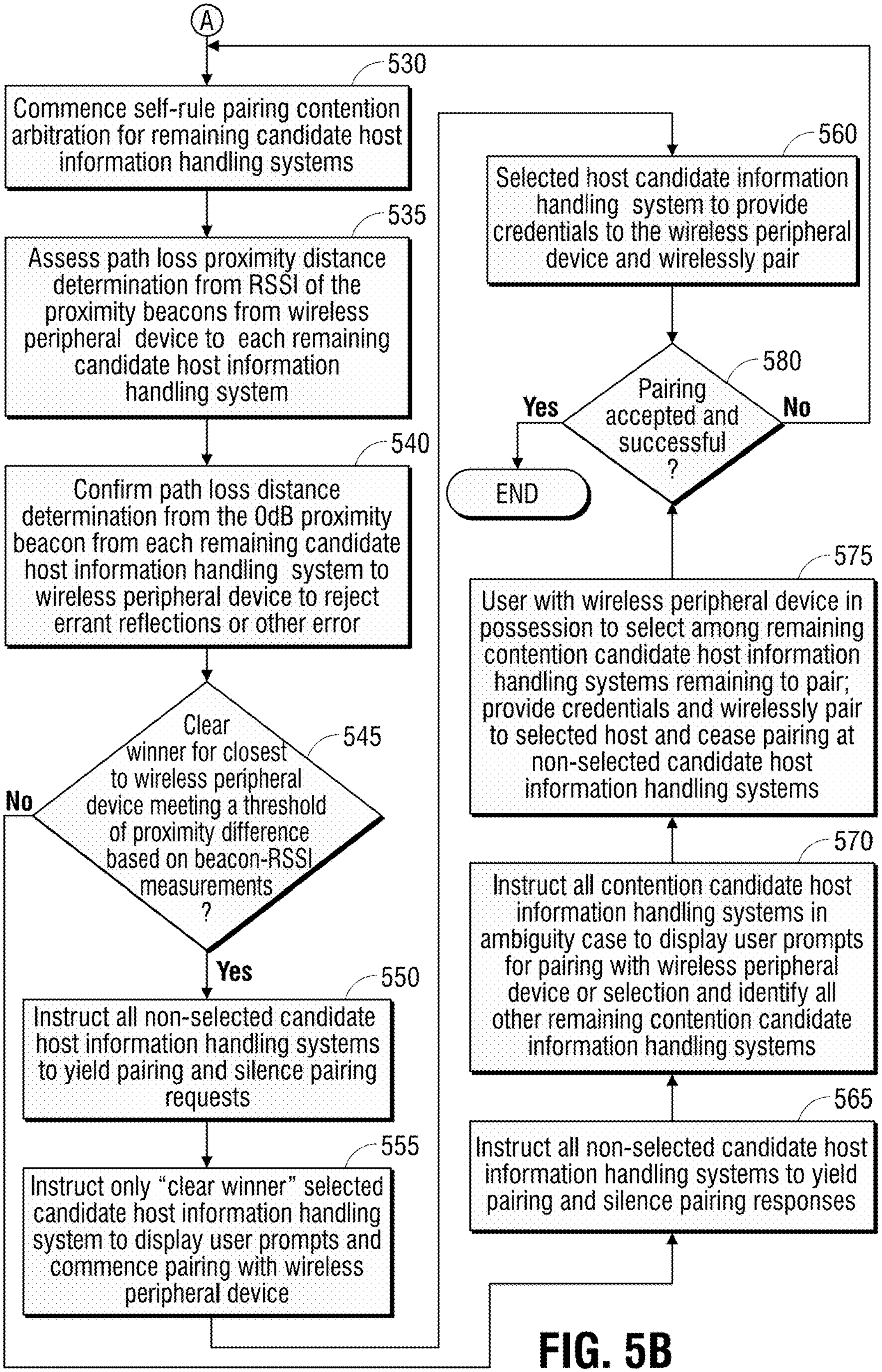

FIG. 5A is a flowchart showing a method 500 of pre-pairing host contention arbitration for a wireless peripheral device attempting to pair to an intended candidate host information handling system in a congested workspace having a group of candidate host information handling systems according to another embodiment of the present disclosure. FIG. 5B is a continuation flowchart showing the method 500 of pre-pairing host contention arbitration for a wireless peripheral device attempting to pair to an intended candidate host information handling system in a congested workspace having a group of candidate host information handling systems according to the embodiment of the present disclosure. As described herein, the method 500 may be used to filter out candidate host information handling systems in a congested workspace based on proximity distances in embodiments herein. Some or all portions of the pre-pairing host contention arbitration are executed on the wireless peripheral device or at a secure remote server location before pairing while minimizing triggering pairing notice requests or commencing pairing request functions at too many candidate host information handling systems. Then, the wireless peripheral device may securely and operatively pair to a selected host information handling system from among a plurality of candidate host information handling systems.

The method 500 may begin with the user initiating a wireless peripheral devices in a congested workspace environment with a plurality of candidate host information handling systems at block 505. This initiation process may include the user activating a power button, switch, or other key at the wireless peripheral device to be powered on. In an embodiment, by initiating the wireless peripheral device, power may be provided to a hardware microcontroller or other hardware processor of the wireless peripheral device. By providing power to the peripheral device microcontrollers, the computer-readable program code of a pre-pairing host contention and arbitration module may be executed by the peripheral device microcontroller to commence begin advertising a BLE GATT communication with the plurality of candidate host information handling systems within wireless range of the wireless peripheral device in the congested workspace as described herein.

At block 510, each of the plurality of candidate host information handling systems may be monitoring for BLE GATT communications via its wireless adapter when operating under the BLE protocols to receive pairing requests or other GATT messages from wireless peripheral devices and the like. Upon receiving the initial GATT beacon from the newly powered wireless peripheral device looking to pair with an intended host information handling systems, the plurality of candidate host information handling systems within wireless range respond with an acknowledgement and establish a GATT wireless link to the wireless peripheral device.

Proceeding to block 515, after establishing GATT connectivity, the peripheral device hardware microcontroller executes the computer-readable program code of a pre-pairing host contention and arbitration module to conduct a staggered exchange of a set of pairing proximity beacons with each of the plurality of candidate host information handling systems that responded according to embodiments of the present disclosure. Execution of the computer-readable program code of a pre-pairing host contention and arbitration module causes the wireless peripheral device to conduct a staggered exchange of two or more proximity pairing beacons between the wireless peripheral device and each of the candidate host information handling systems within wireless range of receiving those GATT beacon communications according to an embodiment of the present disclosure. The wireless peripheral device may send and receive a set of BLE proximity pairing beacons, staggered in time, to each of the plurality of candidate host information handling systems in an embodiment.

Each set of BLE proximity pairing beacons is staggered in exchange with each of the candidate host information handling systems. Each set of BLE proximity pairing beacons includes a first proximity pairing beacon transmitted from the wireless peripheral device to the candidate host information handling system at a reduced signal power level, such as −4 dB, which is below a typical signal power level for GATT beacon communication according to an embodiment. This yields a first RSSI level measured at each candidate host information handling system. The set of BLE proximity pairing beacons also includes a second proximity pairing beacon transmitted from the wireless peripheral device to the candidate host information handling system at a regular signal power level (e.g., 0 dB) typical for a GATT beacon communication for determination of a second RSSI level at each candidate host information handling system in another embodiment. This yields a second RSSI measurement for the second pairing proximity beacon at each candidate host information handling system. The set of BLE proximity pairing beacons of the set of proximity beacons includes a third proximity pairing beacon in yet another embodiment transmitted in a reverse direction from each candidate host information handling system to the wireless peripheral device at regular signal power level of 0 dB for determination of a third RSSI level at the wireless peripheral device. Any two or all three pairing proximity beacons may be sent in various embodiments and any or all measured RSSI levels may be used for pre-pairing host contention and arbitration to filter among the candidate host information handling systems for a closest candidate host information handling system.

The three proximity beacon RSSI measurements provides for an ability to reduce or correct for transmission or reception errors such as due to large object reflections and other issues in determining pathloss or proximity distances between the wireless peripheral device and each of the candidate host information handling systems. With three pairing proximity beacons exchanged, this may be referred to as a three-factor proximity distance determination in some embodiments herein. In other embodiments, the first two proximity beacons may only be used for proximity distance determination. In a further embodiment, the third proximity beacon may not be sent as a separate pairing proximity beacon, but instead be an acknowledgement response beacon from the candidate host information handling systems to either of the first or second pairing proximity beacons sent ahead of it in some example embodiments.

At block 520, the first proximity beacon with reduced signal power may be used to conduct a first filtration of far away candidate host information handling systems that are still within range of the wireless peripheral device. When the peripheral device hardware microcontroller executes code instructions of the pre-pairing host contention and arbitration module to send the first pairing proximity beacon via GATT communication, it is at lowered signal power such that range of effective transmission may be reduced in an embodiment. In an example embodiment, reducing signal power of the first pairing proximity beacon may be a reduction of −4 dB. In an example embodiment, signal power of the first pairing proximity beacon may be reduced by an amount to filter out candidate host information handling systems greater than 1 meter away from the wireless peripheral device. Far away candidate host information handling systems that fall beyond the lower signal power effective range will not respond to the first pairing proximity beacon at a lower signal power being sent from the wireless peripheral device in embodiments herein. Thus, the peripheral device hardware microcontroller executes code instructions of the pre-pairing host contention and arbitration module including operating a timeout timer for a response to the pairing proximity beacons. The peripheral device hardware microcontroller executes code instructions of the pre-pairing host contention and arbitration module to determine when no response is received before the timeout response timer expires from any far away candidate host information handling systems to the lowered signal power transmission of the first pairing proximity beacon at block 520.

If at block 520, none of the candidate host information handling systems in the congested workspace area fail to respond to the first pairing proximity beacon after expiration the timeout timer, then flow may proceed to block 530. If at block 520, any of the candidate host information handling systems in the congested workspace area fail to respond to the first pairing proximity beacon after expiration of the timeout timer, then flow may proceed to block 525.

At block 525, the peripheral device hardware microcontroller executes code instructions of the pre-pairing host contention and arbitration module at the wireless peripheral device may transmit an instruction via GATT communication at a typical signal power level to any non-responding candidate host information handling systems at block 520 to instruct them to yield pairing and silence any further pairing responses to the wireless peripheral device in embodiments herein. This will therefore filter out any far away, such as greater than 1 meter, candidate host information handling systems from contention for pairing with the wireless peripheral device. In an embodiment, code instructions of the pre-pairing host contention and arbitration agent executing at far away, non-responding candidate host information handling systems will block any further pairing operations with the wireless peripheral device.

Proceeding to block 530, self-rule pairing contention arbitration will commence for all remaining candidate host information handling systems not eliminated at block 525, if any were eliminated. The measured proximity beacon RSSI measurements for each of the pairing proximity beacons exchanged, for example the three pairing proximity beacons, may be shared to a common location for determination of pathloss measurements or even to determine or correlate pathloss to proximity distances between the wireless peripheral device and each of the remaining candidate host information handling systems. In some embodiments, each of the remaining candidate host information handling systems may have a secure network peer-to-peer link with one another or to a local secure network server location and the proximity beacon RSSI measurements may be transmitted or broadcasted via a peer to peer secure network among remaining candidate host information handling systems or to a local secure network server location from each of the each of the remaining candidate host information handling systems and the wireless peripheral device. If such a peer to peer secure network or a local secure network server location is not available, the proximity beacon RSSI measurements may be transmitted to the wireless peripheral device to be shared there for determination of pathloss, proximity distances, and comparison in other embodiments.

At block 535, the one of the peer to peer networked candidate host information handling system or the secure local network server executes code instructions of a pre-pairing host contention and arbitration agent to determine pathloss measurements between the wireless peripheral device and each of the candidate host information handling systems from the RSSI measurements from the first pairing proximity beacon and second pairing proximity beacon sent to each candidate host information handling system in an embodiment. In another embodiment, the peripheral device hardware microcontroller executes code instructions of the pre-pairing host contention and arbitration module at the wireless peripheral device to determine pathloss measurements between the wireless peripheral device and each of the candidate host information handling systems from the RSSI measurements from the first pairing proximity beacon and second pairing proximity beacon. With two RSSI measurements at different pairing proximity beacon signal levels, errors in pathloss determination from noise, reflections or other radiofrequency anomalies may be reduced. With the pathloss determinations, a proximity distance may be estimated by the pre-pairing host contention and arbitration agent or module for proximity distances between the wireless peripheral device and each remaining candidate host information handling system in another embodiment. These pathloss level determinations or proximity distance estimations for each candidate host information handling system may be compared to determine closeness of each candidate host information handling system in some embodiments herein.

The pathloss determination and correlation to proximity distance for each candidate host information handling system may be further confirmed by assessment of the RSSI measurement of the third pairing proximity beacon sent from each candidate host information handling system to the wireless peripheral device at block 540 in further embodiments. The RSSI value of the third pairing proximity beacon may have been measured at the wireless peripheral device when received from each candidate host information handling system in an embodiment. This RSSI value further confirms pathloss and proximity distance determination by providing another reference value for those determinations and may further reduce error from large object reflections or other error anomalies in the RSSI measurements that may occur as described in embodiments herein.

At block 545, the one of the peer to peer network candidate information handling systems or a secure network server executes code instructions of a pre-pairing host contention and arbitration agent to compare pathloss levels or proximity distances for each of the remaining candidate host information handling system from the wireless peripheral device in an embodiment. In another embodiment, the pathloss levels or proximity distances may be transmitted to the wireless peripheral device or may have been transmitted to the wireless peripheral device. In such an embodiment, the peripheral device hardware microcontroller executes code instructions of a pre-pairing host contention and arbitration module to compare pathloss levels or proximity distances for each of the remaining candidate host information handling system from the wireless peripheral device. The comparison may determine if any one of the remaining candidate host information handling systems is a "clear winner" that is closer in pairing proximity distance or has less pathloss than the other remaining candidate host information handling systems. In one example embodiment, the "clear winner" may be determined by assessing difference between the proximity distances from the wireless peripheral device to each of the remaining candidate host information handling systems.

If the difference between the proximity distance for any one remaining candidate host information handling system compared to all other proximity distances for all other remaining candidate host information handling systems is greater than a proximity distance difference threshold level, then a clear winner may be selected as a selected host information handling system for pairing in an embodiment. In another embodiment, the comparison may be made using pathloss level values and determining whether a pathloss value level difference threshold is met or exceeded compared to all other pathloss levels.

In some embodiments, the proximity distance difference threshold level or pathloss value level difference threshold is not met between two or more of the remaining candidate host information handling systems. Although a "clear winner" selected candidate host information handling system may not be selected at block 545 in such an embodiment, other remaining candidate host information handling systems may be eliminated by this self-rule pairing contention arbitration based on proximity distances (or pathloss levels) when the eliminated candidate host information handling systems are above a proximity distance difference threshold (or pathloss difference levels) with the closest estimate candidate host information handling system or systems in embodiments herein. However, any two or more close remaining candidate host information handling systems within a proximity distance difference threshold or pathloss difference threshold may need to be selected by a user for pairing with the wireless peripheral device at this point in the self-rule pairing contention.

When a clear winner is determined by comparison of the candidate host information handling systems to select a host information handling system at block 545, the flow proceeds to block 550. When at least two remaining candidate host information handling systems are both close enough that a proximity distance difference threshold or pathloss difference threshold is not met or exceeded, the flow proceeds to block 565.

At block 550, the peripheral device hardware microcontroller executes code instructions of a pre-pairing host contention and arbitration module to send an instruction to all non-selected, remaining candidate host information handling systems to yield pairing to the selected host information handling system "clear winner" as determined above and to silence responses or operation in response to any pairing requests from the wireless peripheral device. Again, the execution of code instructions of a pre-pairing host contention and arbitration agent at each of the non-selected candidate host information handling systems may operate to cease pairing operations and responses to pairing requests from the wireless peripheral device. This may prevent a pairing request notification from appearing on the display device or display devices of all non-selected remaining candidate host information handling system in an embodiment.

Proceeding to block 555, the peripheral device hardware microcontroller executes code instructions of a pre-pairing host contention and arbitration module to send an instruction to the selected host information handling system in the congested workspace to commence pairing with a pairing request from the wireless peripheral device in an embodiment. The selected host information handling system will execute code instructions of a pre-pairing host contention and arbitration agent to permit display of a pairing request notification and prompt on the display device to request user confirmation of pairing. At block 560, when pairing is accepted the wireless peripheral device and the selected host information handling system will exchange pairing credentials such as verification of passcodes shared between them, manual entry of passcodes, gesture instructions and response or other pairing verification and authentication techniques under the Bluetooth® or BLE protocols in embodiments herein. Then the selected host information handling system and the wireless peripheral device will pair with a lower security risk and with elimination of extraneous triggering pairing notices on a plurality of candidate host information handling systems in the congested workspace. If the pairing has been rejected by a user or is unsuccessful at block 580, the flow may return to block 530 to continue to search for another closest candidate information handling system in the congested workspace. If the pairing has been accepted by a user and is successful at block 580, at this point, the method may end.

Returning to block 565, if two or more remaining candidate host information handling systems are both close enough that a proximity distance difference threshold or pathloss difference threshold is not met or exceeded at block 545, the peripheral device hardware microcontroller executes code instructions of a pre-pairing host contention and arbitration module to send an instruction to all non-selected, remaining candidate host information handling systems, other than the two or more closest candidates, to yield pairing to the two or more host candidate information handling systems that are both within a difference threshold. The instruction may further silence responses or operation in response to any pairing requests from the wireless peripheral device at all other non-selected candidate host information handling systems. Again, the execution of code instructions of a pre-pairing host contention and arbitration agent at each of the non-selected candidate host information handling systems may operate to cease pairing operations and responses to pairing requests from the wireless peripheral device. This may prevent extraneous pairing request notifications from appearing on the display device or display devices of all non-selected remaining candidate host information handling systems in an embodiment.

At block 570, the two or more closest remaining candidate host information handling systems are sent an instruction to permit display of a pairing request notification or notification that the user must select among the two or more closest remaining candidate host information handling systems. The notification may prompt on the display device to request user select or confirmation of pairing at both of the two or more closest remaining candidate host information handling systems as determined at block 545 in an embodiment. In another embodiment, each of the two or more closest remaining candidate host information handling systems may display instructions on a display device for prompting pairing and to identify all of the other contending two or more closest remaining candidate host information handling systems so that the user knows what other two or more closest remaining candidate host information handling systems have been prompted for pairing. In yet another embodiment, the pairing notification prompt may display instructions for a gesture using the wireless peripheral device, such which keyboard key to press or mouse button to press to select among the two or more closest remaining candidate host information handling systems for pairing.

At block 575, a user proximate to the two or more closest remaining candidate host information handling systems may select which of the two or more closest remaining candidate host information handling systems to pair and reject pairing at the other in an embodiment. Upon the user selecting among the two or more closest remaining candidate host information handling systems, the other remaining candidate host information handling systems may receive another instruction to yield pairing to the selected host information handling system as determined above and to silence responses or operation in response to any further pairing requests from the wireless peripheral device. Again, the execution of code instructions of a pre-pairing host contention and arbitration agent at each of the non-selected candidate host information handling systems may operate to cease pairing operations and responses to pairing requests from the wireless peripheral device. This may prevent any further pairing activity or credential exchange at all non-selected remaining candidate host information handling system in an embodiment.

The wireless peripheral device and the selected host information handling system will exchange pairing credentials, if pairing is accepted. Pairing credentials exchanged may include verification of passcodes shared between them, manual entry of passcodes, gesture instructions and response or other pairing verification and authentication techniques under the Bluetooth® or BLE protocols in embodiments herein at block 575. Then the selected host information handling system and the wireless peripheral device will pair under the Bluetooth® or BLE wireless protocol. Again, if the pairing has been rejected by a user or is unsuccessful at block 580, the flow may return to block 530 to continue to search for another closest candidate information handling system in the congested workspace. If the pairing has been accepted by a user and is successful at block 580, at this point, the method may end.

The blocks of the flow diagrams of FIGS. 3A, 3B, and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wireless peripheral device operatively couplable to a first host candidate information handling system among a plurality of host candidate information handling systems comprising:

a peripheral device hardware microcontroller, a peripheral device storage device, and a peripheral device wireless radio;

the peripheral device hardware microcontroller configured to execute computer-readable program code of a pre-pairing host contention and arbitration module to transmit, via the peripheral device radio, a first pairing proximity discovery beacon and a second pairing proximity beacon to each of the plurality of candidate host information handling systems in wireless range of the wireless peripheral device, where the first pairing proximity beacon has a lower signal power than the second pairing proximity beacon;

the peripheral device radio configured to transmit an instruction to cease pairing to a non-responding candidate host information handling system among the plurality of candidate host information handling systems that fails to respond to the first pairing proximity beacon;

the peripheral device hardware microcontroller configured to receive a received signal strength indicator (RSSI) value from each of a remaining plurality of candidate host information handling systems for each of the first pairing proximity discovery beacon and the second pairing proximity beacon to determine a physical proximity distance of each of the remaining plurality of candidate host information handling systems;

the peripheral device hardware microcontroller configured to select a first candidate host information handling system from among the remaining plurality of candidate host information handling systems when the first physical proximity distance of the first candidate host information handling system to the wireless peripheral device is more than a threshold difference amount of physical proximity distance closer than other of the remaining plurality of candidate host information handling systems; and the peripheral device hardware microcontroller configured to execute code instructions to commence pairing with the first candidate host information handling system and instruct user prompts for pairing to be displayed at the first candidate host information handling system.

2. The peripheral device of claim 1, wherein the peripheral device radio transmits the instruction to cease pairing to the remaining plurality of candidate host information handling systems that are not the selected first candidate host information handling system.

3. The peripheral device of claim 1 further comprising:

select a second candidate host information handling system from the remaining plurality of candidate host information handling systems when the first physical proximity distance of the first candidate host information handling system and a second physical proximity distance of the second candidate host information handling system are both within the threshold difference amount of physical proximity distance from the wireless peripheral device; and the peripheral device hardware microcontroller executing code instructions of the pairing module to commence pairing with the second candidate host information handling system and instruct the user prompts for pairing to be displayed at the second candidate host information handling system in addition to the first candidate host information handling system for a user to select between the first candidate host information handling system and the user second candidate host information handling system for pairing.

4. The peripheral device of claim 1, wherein transmitting the first pairing proximity discovery beacon and the second pairing proximity beacon to each of the plurality of candidate host information handling systems in wireless range of the wireless peripheral device is sequentially staggered by the wireless peripheral device to conduct an RSSI collection at each candidate host information handling system sequentially.

5. The peripheral device of claim 1 further comprising:

the peripheral device radio configured to receive a third pairing proximity discovery beacon transmitted from each of the remaining plurality of candidate host information handling systems for further determination of physical proximity distances for each of the remaining plurality of candidate host information handling systems.

6. The peripheral device of claim 5, wherein the physical proximity distance of each candidate host information handling systems is determined based on a three-factor pathloss value determinations from RSSI values of transmission of the first pairing proximity discovery beacon and the second pairing proximity beacon to each of the remaining plurality of candidate host information handling systems and receipt of the third pairing proximity discovery beacon from each of the remaining plurality of candidate host information handling systems to eliminate large object reflections and other physical proximity distance errors.

7. The peripheral device of claim 1 further comprising:

the peripheral device hardware microcontroller executing computer readable code instructions of a hash loop algorithm that runs a loop of advance encryption algorithms and a SHA256 hybrid algorithm to generate matching passcodes based on seed values at the wireless peripheral device and at the selected first candidate host information handling system for matching passcodes for pairing when a user accepts prompts for pairing displayed at the first candidate host information handling system.

8. The peripheral device of claim 1, wherein the peripheral device radio establishes generic attribute profile (GATT) communications under the Bluetooth® Low Energy (BLE) protocol to transmit the first pairing proximity discovery beacon and the second pairing proximity beacon to each of the plurality of candidate host information handling systems in wireless range of the wireless peripheral device.

9. A method of arbitration for pairing a wireless peripheral device within a congested workspace having a plurality of candidate host information handling systems comprising:

transmitting, via the peripheral device radio, a first pairing proximity discovery beacon and a second pairing proximity beacon to each of the plurality of candidate host information handling systems in wireless range of the wireless peripheral device, where the first pairing proximity beacon has a lower signal power than the second pairing proximity beacon;

receiving, via the peripheral device radio, a third pairing proximity discovery beacon transmitted from each of the plurality of candidate host information handling systems for further determination of physical proximity distances for each of the plurality of candidate host information handling systems; and executing computer-readable program code of a pre-pairing host contention and arbitration module via a hardware processor to compare candidate host information handling system physical proximity distances of each of the plurality of candidate host information handling systems from the wireless peripheral device, where physical proximity distances of each candidate host information handling system is determined based on a three-factor pathloss value determinations from received signal strength indicator (RSSI) values of transmission of the first pairing proximity discovery beacon and a second pairing proximity beacon to each candidate host information handling system and receipt of the third pairing proximity discovery beacon from each candidate host the information handling system to eliminate large object reflections and other physical proximity distance errors in pathloss determinations;

selecting, via the peripheral device hardware microcontroller, a first candidate host information handling system from among the plurality of candidate host information handling systems when the first physical proximity distance of the first candidate host information handling system to the wireless peripheral device is more than a threshold difference amount of physical proximity distance closer than other of the plurality of candidate host information handling systems; and executing code instructions of a pairing module, via the peripheral device hardware microcontroller, to commence pairing with the first candidate host information handling system and instruct user prompts for pairing to be displayed at the first candidate host information handling system.

10. The method of claim 9 further comprising:

transmitting, via the peripheral device radio, an instruction to cease pairing to a non-responding candidate host information handling system among the plurality of candidate host information handling systems that fails to respond to the first pairing proximity beacon.

11. The method of claim 9 further comprising:

transmitting, via the peripheral device radio, an instruction to cease pairing to each of the remaining plurality of candidate host information handling systems that are not the selected first candidate host information handling system.

12. The method of claim 9 further comprising:

selecting a second candidate host information handling system from the plurality of candidate host information handling systems when the first physical proximity distance of the first candidate host information handling system and a second physical proximity distance of the second candidate host information handling system are both within the threshold difference amount of physical proximity distance from the wireless peripheral device; and executing code instructions of a pairing module, via the peripheral device hardware microcontroller, to commence pairing with the second candidate host information handling system and instructing the user prompts for pairing to be displayed at the second candidate host information handling system in addition to the first candidate host information handling system for a user to select between the first candidate host information handling system and the user second candidate host information handling system for pairing.

13. A wireless peripheral device operatively couplable to a first candidate host information handling system among a plurality of candidate host information handling systems comprising:

a peripheral device hardware microcontroller, a peripheral device storage device, and a peripheral device wireless radio;

the peripheral device hardware microcontroller configured to execute computer-readable program code of a pre-pairing host contention and arbitration module to begin transmitting, via the peripheral device radio, a first pairing proximity discovery beacon and a second pairing proximity beacon to each of the plurality of candidate host information handling systems in wireless range of the wireless peripheral device, where the first pairing proximity beacon has a signal power level lower than the second pairing proximity beacon;

the peripheral device radio configured to transmit an instruction to cease pairing to a non-responding candidate host information handling system among the plurality of candidate host information handling systems that fails to respond to the first pairing proximity beacon;

the peripheral device hardware microcontroller configured to receive a physical proximity distance of each of a remaining plurality of candidate host information handling systems from a secure local network peer to peer networked device determining pathloss values from a received signal strength indicator (RSSI) value from each of the remaining plurality of candidate host information handling systems for each of the first pairing proximity discovery beacon and the second pairing proximity beacon, where each of the remaining plurality of candidate host information handling systems is operatively coupled to the secure local network;

the peripheral device hardware microcontroller configured to select the first candidate host information handling system from among the remaining plurality of candidate host information handling systems when the first physical proximity distance of the first candidate host information handling system to the wireless peripheral device is more than a threshold difference amount of physical proximity distance closer than other of the remaining plurality of candidate host information handling systems; and the peripheral device hardware microcontroller configured to execute code instructions of a pairing module to commence pairing with the first candidate host information handling system and instruct user prompts for pairing to be displayed at the first candidate host information handling system.

14. The peripheral device of claim 13, wherein the peripheral device radio transmits the instruction to cease pairing to the remaining candidate host information handling systems that are not the selected first candidate host information handling system.

15. The peripheral device of claim 13 further comprising:

select a second candidate host information handling system from the remaining plurality of candidate host information handling systems when the first physical proximity distance of the first candidate host information handling system from the wireless peripheral device and a second physical proximity distance of the second candidate host information handling system from the wireless peripheral device are both within the threshold difference amount of each other; and the peripheral device hardware microcontroller executing code instructions of the pairing module to commence pairing with the second candidate host information handling system and instruct the user prompts for pairing to be displayed at the second candidate host information handling system in addition to the first candidate host information handling system for a user to select between the first candidate host information handling system and the user second candidate host information handling system for pairing.

16. The peripheral device of claim 13, wherein transmitting the first pairing proximity discovery beacon and the second pairing proximity beacon to each of the plurality of candidate host information handling systems in wireless range of the wireless peripheral device is sequentially staggered by the wireless peripheral device to conduct RSSI collection at each candidate host information handling system sequentially.

17. The peripheral device of claim 13 further comprising:

the peripheral device radio configured to receive a third pairing proximity discovery beacon transmitted from each of the plurality of candidate host information handling systems to determine RSSI values for the third pairing proximity discovery beacon for further determination of physical proximity distances for each of the remaining plurality of candidate host information handling systems.

18. The peripheral device of claim 17, wherein the proximity distance of each candidate host information handling systems is determined based on a three-factor pathloss value determinations from RSSI values of transmission of the first pairing proximity discovery beacon and the second pairing proximity beacon to each candidate host information handling system and receipt of the third pairing proximity discovery beacon from each candidate host the information handling system to eliminate large object reflections and other proximity distance errors.

19. The peripheral device of claim 13 further comprising:

the peripheral device hardware microcontroller executing computer readable code instructions to determine matching passcodes at the wireless peripheral device and at the selected first candidate host information handling system for pairing when a user accepts prompts for pairing displayed at the first candidate host information handling system.

20. The peripheral device of claim 13, wherein the peripheral device radio establishes generic attribute profile (GATT) communications under the Bluetooth® Low Energy (BLE) protocol to transmit the first pairing proximity discovery beacon and the second pairing proximity beacon to each of the plurality of candidate host information handling systems in wireless range of the wireless peripheral device.

* * * * *